US012520096B2

(12) United States Patent
Landemaine et al.

(10) Patent No.: US 12,520,096 B2
(45) Date of Patent: Jan. 6, 2026

(54) SPATIALIZED AUDIO WITH DYNAMIC HEAD TRACKING

(71) Applicant: Bose Corporation, Framingham, MA (US)

(72) Inventors: Thomas Landemaine, Cambridge, MA (US); Wade Torres, Attleboro, MA (US)

(73) Assignee: Bose Corporation, Framingham, MA (US)

( * ) Notice: Subject to any disclaimer, the term of this patent is extended or adjusted under 35 U.S.C. 154(b) by 257 days.

(21) Appl. No.: 18/182,290

(22) Filed: Mar. 10, 2023

(65) Prior Publication Data

US 2024/0305946 A1 Sep. 12, 2024

(51) Int. Cl.

*H04S 7/00* (2006.01)
*H04R 5/033* (2006.01)
*H04S 1/00* (2006.01)

(52) U.S. Cl.

CPC ............ *H04S 7/304* (2013.01); *H04R 5/033* (2013.01); *H04S 1/007* (2013.01); *H04S 2400/11* (2013.01)

(58) Field of Classification Search

CPC .. H04S 7/304; H04S 2400/11; H04S 2420/01; H04S 7/303; H04S 7/30; H04S 7/302; H04R 5/033
USPC .............. 381/310, 303, 74, 309, 58, 92, 370
See application file for complete search history.

(56) References Cited

U.S. PATENT DOCUMENTS 6,446,002 B1 9/2002 Barton
7,305,097 B2 12/2007 Rosen et al.
7,630,500 B1 12/2009 Beckman et al.
8,325,936 B2 12/2012 Eichfeld et al.
9,066,191 B2 6/2015 Strauss et al.
9,075,127 B2 7/2015 Hess et al.
9,215,545 B2 12/2015 Dublin et al.
9,352,701 B2 5/2016 Vautin et al.
9,445,197 B2 9/2016 Oswald et al.
9,674,630 B2 6/2017 Mateos Sole et al.
9,706,327 B2 7/2017 Brannmark et al.
9,743,187 B2 8/2017 Bender
9,913,065 B2 3/2018 Vautin et al.
9,955,261 B2 4/2018 Ojala et al.
(Continued)

FOREIGN PATENT DOCUMENTS

WO 2018127901 A1 7/2018
WO 2020035335 A1 2/2020

OTHER PUBLICATIONS

International Search Report and the Written Opinion of the International Searching Authority, International Application No. PCT/US2024/014523, dated May 13, 2024, pp. 1-11.

(Continued)

*Primary Examiner* — Norman Yu

(74) *Attorney, Agent, or Firm* — Bond, Schoeneck & King, PLLC

(57) ABSTRACT

A device and method for providing spatialized audio with dynamic head tracking that includes, in a static phase, providing a spatialized acoustic signal to a user that is perceived as originating from a virtual soundstage at a first location, and, upon determining one or more predetermined conditions are satisfied, which can include whether the users head has exceeded an angular bound, rotating the virtual soundstage to track the movement of the user's head.

18 Claims, 19 Drawing Sheets

(56) References Cited

U.S. PATENT DOCUMENTS

| | | | |
|---|---|---|---|
| 10,056,068 B2 | 8/2018 | Oswald et al. | |
| 10,123,145 B2 | 11/2018 | Vautin et al. | |
| 10,694,313 B2 | 6/2020 | Zilberman et al. | |
| 10,721,521 B1 | 7/2020 | Robinson et al. | |
| 10,812,926 B2 | 10/2020 | Asada et al. | |
| 11,617,050 B2 | 3/2023 | Torres et al. | |
| 2008/0101589 A1 | 5/2008 | Horowitz et al. | |
| 2008/0170730 A1 | 7/2008 | Azizi et al. | |
| 2008/0273708 A1 | 11/2008 | Sandgren et al. | |
| 2008/0273722 A1 | 11/2008 | Aylward et al. | |
| 2008/0273724 A1 | 11/2008 | Hartung et al. | |
| 2008/0304677 A1 | 12/2008 | Abolfathi et al. | |
| 2009/0046864 A1 | 2/2009 | Mahabub et al. | |
| 2009/0214045 A1 | 8/2009 | Fukui et al. | |
| 2010/0226499 A1 | 9/2010 | De Bruijn et al. | |
| 2012/0008806 A1 | 1/2012 | Hess | |
| 2012/0070005 A1 | 3/2012 | Inou et al. | |
| 2012/0093320 A1 | 4/2012 | Flaks et al. | |
| 2012/0140945 A1 | 6/2012 | Harris | |
| 2013/0041648 A1 | 2/2013 | Osman | |
| 2013/0121515 A1 | 5/2013 | Hooley et al. | |
| 2013/0194164 A1 | 8/2013 | Sugden et al. | |
| 2014/0153751 A1 | 6/2014 | Wells | |
| 2014/0198918 A1 | 7/2014 | Li et al. | |
| 2014/0314256 A1 | 10/2014 | Fincham et al. | |
| 2014/0334637 A1 | 11/2014 | Oswald et al. | |
| 2014/0347390 A1* | 11/2014 | Poulos | G06F 3/011 345/633 |
| 2015/0092965 A1 | 4/2015 | Umminger et al. | |
| 2015/0119130 A1 | 4/2015 | Lovitt | |
| 2015/0208166 A1 | 7/2015 | Raghuvanshi et al. | |
| 2016/0100250 A1 | 4/2016 | Baskin et al. | |
| 2016/0286316 A1 | 9/2016 | Bleacher et al. | |
| 2016/0360224 A1 | 12/2016 | Laroche et al. | |
| 2016/0360334 A1 | 12/2016 | Wu et al. | |
| 2017/0078820 A1 | 3/2017 | Brandenburg et al. | |
| 2017/0085990 A1 | 3/2017 | Sladeczek et al. | |
| 2018/0020312 A1 | 1/2018 | Visser et al. | |
| 2018/0077513 A1* | 3/2018 | Link | G02B 27/017 |
| 2018/0077514 A1 | 3/2018 | Lee et al. | |
| 2018/0091922 A1* | 3/2018 | Satongar | G06F 3/012 |
| 2018/0124513 A1 | 5/2018 | Kim et al. | |
| 2018/0146290 A1 | 5/2018 | Christoph et al. | |
| 2018/0232471 A1 | 8/2018 | Schissler et al. | |
| 2019/0037334 A1 | 1/2019 | Acharya | |
| 2019/0104363 A1 | 4/2019 | Vautin et al. | |
| 2019/0187244 A1 | 6/2019 | Riccardi et al. | |
| 2019/0313201 A1 | 10/2019 | Torres et al. | |
| 2019/0357000 A1 | 11/2019 | Karkkainen et al. | |
| 2020/0037097 A1 | 1/2020 | Torres et al. | |
| 2020/0107147 A1 | 4/2020 | Munoz et al. | |
| 2020/0275207 A1 | 8/2020 | Zilberman et al. | |
| 2020/0413213 A1 | 12/2020 | Konagai | |
| 2021/0400417 A1 | 12/2021 | Freeman et al. | |

OTHER PUBLICATIONS

Vera Erbes et al., "Extending the closed-form image source model for source directivity (Digital appendix)", Proceedings DAGA 2018 Munich, Mar. 22, 2018 (Mar. 22, 2018), pp. 1298-1301, XP055685529, DOI: 10.14279/depositonce-6724.

International Search Report and the Written Opinion of the International Searching Authority, International Patent Application No. PCT/US2020/053068, pp. 1-15, dated Dec. 4, 2020.

International Search Report and the Written Opinion of the International Searching Authority, International Patent Application No. PCT/US2021/072012, pp. 1-14, dated Feb. 11, 2022.

International Search Report and the Written Opinion of the International Searching Authority, International Patent Application No. PCT/US2021/072072, pp. 1-13, dated Mar. 10, 2022.

International Search Report and the Written Opinion of the International Searching Authority, International Patent Application No. PCT/US2021/070709, pp. 1-11, dated Oct. 5, 2021.

International Search Report and the Written Opinion of the International Searching Authority, International Patent Application No. PCT/US2021/071464, pp. 1-19, dated Feb. 24, 2022.

International Preliminary Report on Patentability, International Patent Application No. PCT/US2020/053068, pp. 1-11, dated Apr. 5, 2022.

"Omnidirectional.", Sweetwater, Nov. 3, 1997, www.sweetwater.com/insync/omnidirectional/#:~:text=Speakers%20are%20omnidirectional%20if%20they,beam%80%9D%20or%20be%20very%20directional. (Year: 1997).

International Search Report and the Written Opinion of the International Searching Authority, International Application No. PCT/US2019/024618, pp. 1-15, dated Jun. 19, 2019.

Jot et al., Augmented Reality Headphone Environment Rendering, Audio Engineering Society Conference Paper, 2016, pp. 1-6.

International Preliminary Report on Patentability, International Patent Application No. PCT/US2021/0071464, pp. 1-13, dated Mar. 21, 2023.

International Preliminary Report On Patentability, PCT Application No. PCT/US2024/014523, dated Sep. 9, 2025, pp. 1-6.

* cited by examiner

SPATIALIZED AUDIO WITH DYNAMIC HEAD TRACKING

BACKGROUND

This disclosure generally relates to systems and methods for providing spatialized audio with dynamic head tracking.

SUMMARY

All examples and features mentioned below can be combined in any technically possible way.

According to an aspect, a pair of headphones includes: a sensor outputting a sensor signal representative of an orientation of a user's head; and a controller, receiving the sensor signal, the controller programmed to output a spatialized audio signal, based on the sensor signal, to a pair of electroacoustic transducers for transduction into a spatialized acoustic signal, wherein the spatialized acoustic signal is perceived by the user as originating from a virtual soundstage comprising at least one virtual source, each virtual source of the virtual soundstage being perceived as located at a respective position distinct from the location of the electroacoustic transducers and being referenced to an audio frame of the virtual soundstage, the audio frame being disposed a first location aligned with a reference axis of the user's head; wherein the controller is further programmed to determine, from the sensor signal, whether a characteristic of the user's head satisfies at least one predetermined condition, the at least one predetermined condition including whether the orientation of the user's head is outside a predetermined angular bound, wherein, upon determining the characteristic of the user's head does not satisfy the at least one predetermined condition, the controller is programmed to maintain the audio frame at the first location, wherein, upon determining the orientation of the user's head is outside the predetermined angular bound, the controller is programmed to rotate the location of the audio frame about an axis of rotation to reduce an angular offset with the reference axis of the user's head.

In an example, rotating the location of the audio frame comprises rotating the location of the audio frame to align with the reference axis of the user's head as a turn of the user's head comes to an end.

In an example, while the user's head has an increasing angular acceleration, the angular velocity of the rotation of the audio frame is based, at least in part, on an angular velocity of the user's head.

In an example, while the user's head has a decreasing angular acceleration, the angular velocity of the rotation of the audio frame is selected such that audio frame will align with a predicted location of the reference axis of the user's head as the turn of the user's head comes to an end.

In an example, the predicted location of the reference axis of the user's head as the turn of the user's head comes to an end is updated each sample that the user's head has a decreasing angular acceleration.

In an example, the at least one predetermined condition further includes whether an angular jerk of the user's head exceeds a predetermined threshold, wherein the at least one predetermined condition is satisfied if either the orientation of the user's head is outside the predetermined angular bound or the angular jerk of the user's head exceeds the predetermined threshold.

In an example, upon determining the orientation of the user's head is outside the predetermined angular bound, the controller is programmed to rotate the angular bound about the axis of rotation in conjunction with the audio frame, wherein the location of the audio frame is rotated about an axis of rotation to reduce an angular offset with the reference axis of the user's head for a predetermined period of time after the orientation of the user's head is again within the angular bound.

In an example, upon determining the orientation of the user's head is outside the predetermined angular bound, a second angular bound, narrower than the angular bound, is rotated about the axis of rotation in conjunction with the audio frame, wherein the location of the audio frame is rotated about an axis of rotation to reduce an angular offset with the reference axis of the user's head for a predetermined period of time until the orientation of the user's head is within the second angular bound.

In an example, the at least one virtual source comprises a first virtual source and a second virtual source, the first virtual source being disposed in a first location and the second virtual source being disposed in a second location, wherein the first location and the second location are referenced to the audio frame.

In an example, maintaining the audio frame at a first location comprises rotating the audio frame at a rate tailored to eliminate drift of the sensor.

In an example, the sensor outputting the sensor signal comprises a plurality of sensors outputting a plurality of signals.

According to another example, a method for providing spatialized audio includes: outputting a spatialized audio signal, based on a sensor signal representative of an orientation of a user's head, to a pair of electroacoustic transducers for transduction into a spatialized acoustic signal, wherein the spatialized acoustic signal is perceived by the user as originating from a virtual soundstage comprising at least one virtual source, each virtual source of the virtual soundstage being perceived as located at a respective position distinct from the location of the electroacoustic transducers and being referenced to an audio frame of the virtual soundstage, the audio frame being disposed a first location aligned with a reference axis of the user's head; determining, from the sensor signal, whether a characteristic of the user's head satisfies at least one predetermined condition, the at least one predetermined condition including whether the orientation of the user's head is outside a predetermined angular bound, rotating, upon determining the orientation of the user's head is outside the predetermined angular bound, the location of the audio frame about an axis of rotation to reduce an angular offset with the reference axis of the user's head.

In an example, rotating the location of the audio frame comprises rotating the location of the audio frame to align with the reference axis of the user's head as a turn of the user's head comes to an end.

In an example, while the user's head has an increasing angular acceleration, the angular velocity of the rotation of the audio frame is based, at least in part, on an angular velocity of the user's head.

In an example, while the user's head has a decreasing angular acceleration, the angular velocity of the rotation of the audio frame is selected such that audio frame will align with a predicted location of the reference axis of the user's head as the turn of the user's head comes to an end.

In an example, the predicted location of the reference axis of the user's head as the turn of the user's head comes to an end is updated each sample that the user's head has a decreasing angular acceleration.

In an example, the at least one predetermined condition further includes whether an angular jerk of the user's head exceeds a predetermined threshold, wherein the at least one predetermined condition is satisfied if either the orientation of the user's head is outside the predetermined angular bound or the angular jerk of the user's head exceeds the predetermined threshold.

In an example, upon determining the orientation of the user's head is outside the predetermined angular bound, the angular bound is rotated about the axis of rotation in conjunction with the audio frame, wherein the location of the audio frame is rotated about an axis of rotation to reduce an angular offset with the reference axis of the user's head for a predetermined period of time after the orientation of the user's head is within the angular bound.

In an example, upon determining the orientation of the user's head is outside the predetermined angular bound, a second angular bound, narrower than the angular bound, is rotated about the axis of rotation in conjunction with the audio frame, wherein the location of the audio frame is rotated about an axis of rotation to reduce an angular offset with the reference axis of the user's head for a predetermined period of time until the orientation of the user's head is within the second angular bound.

In an example, wherein the at least one virtual source comprises a first virtual source and a second virtual source, the first virtual source being disposed in a first location and the second virtual source being disposed in a second location, wherein the first location and the second location are referenced to the audio frame.

In an example, wherein maintaining the audio frame at a first location comprises rotating the audio frame at a rate tailored to eliminate drift of the sensor.

In an example, wherein the sensor outputting the sensor signal comprises a plurality of sensors outputting a plurality of signals.

The details of one or more implementations are set forth in the accompanying drawings and the description below. Other features, objects, and advantages will be apparent from the description and the drawings, and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Current headphones that provide spatialized audio fail to deliver a consistent and pleasant experience for users engaged in activities that include frequent head turning, such as walking, running, cycling, etc. To remedy this, such headphones often provide a "fixed mode" in which the audio is "fixed to the user's head," meaning that the audio is always rendered in front of the user (i.e., without head tracking). While this effectively resolves the issues encountered with spatialized audio when engaged in these activities, it also fails to deliver truly spatialized audio. Rendering audio in front of the user's head effectively destroys the auditory illusion of spatialized audio, leading to a "collapse" of the externalized audio inside of the user's head, meaning that the user perceives the audio as originating from the speakers.

Accordingly, there exists a need for headphones that can provide spatialized audio, with head tracking, in a manner that remains a consistent and pleasant experience for user's engaged in activities that require frequent head turning.

Figure 1:
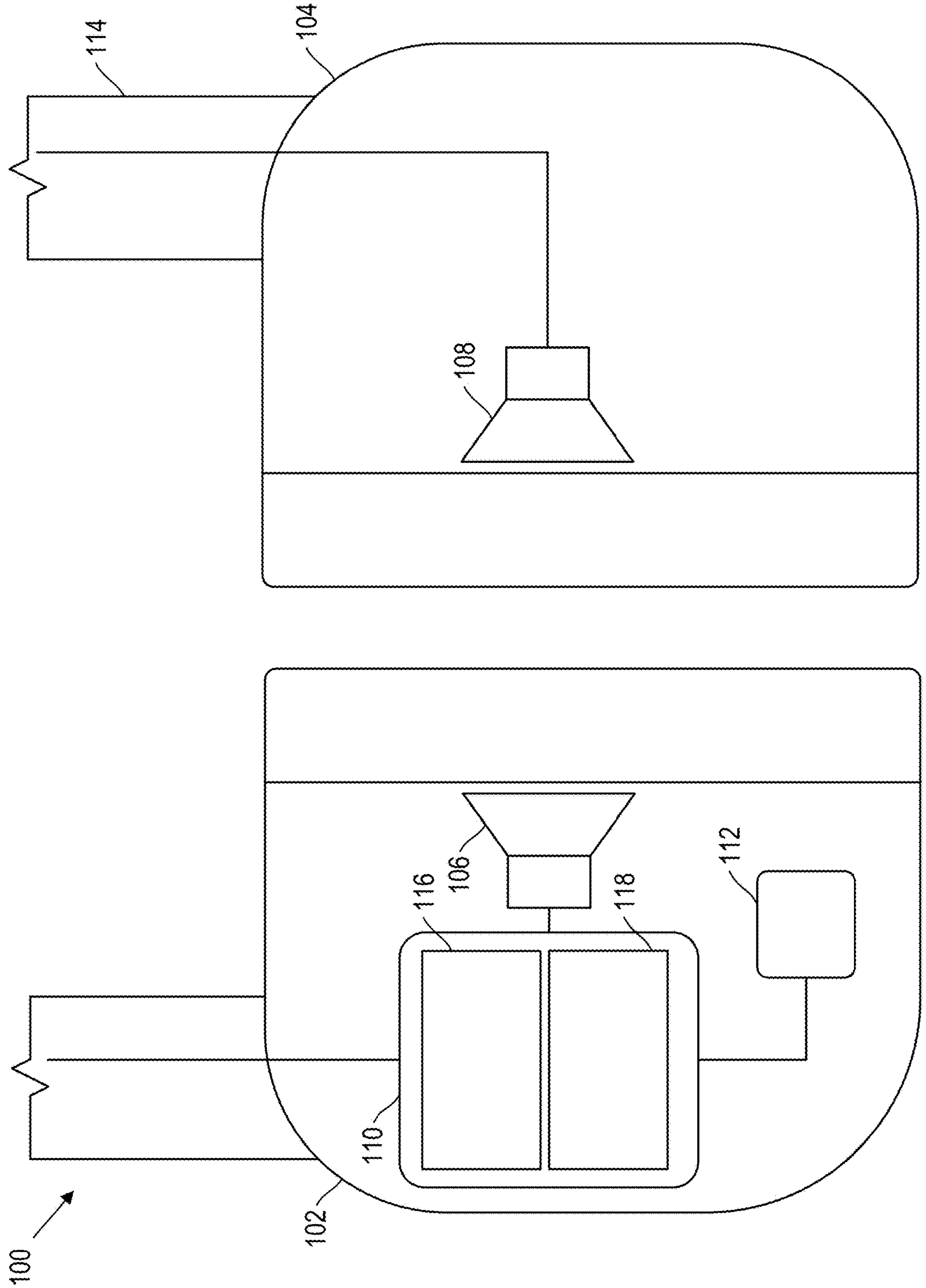
FIG. 1 depicts a block diagram of a pair of headphones configured to provide spatialized audio, according to an example.

There is shown in FIG. 1, an example pair of headphones 100 configured to generate a spatialized audio signal producing a virtual soundstage that, when certain predetermined conditions are met, dynamically tracks the rotation of a user's head. In the example shown, headphones 100 include ear cups 102, 104. Each ear cup 102, 104 includes an electroacoustic transducer 106, 108 (also referred to as speakers) for transducing a received signal into an acoustic signal. Ear cup 102 further houses a controller 110 and a sensor 112 configured to generate a sensor signal representative of an orientation of the user's head. Controller 110, based on the sensor signal, produces a spatialized audio signal—from a received audio signal, such as music or spoken content—to electroacoustic transducers 106, 108, which transduce the spatialized audio signal into a spatialized acoustic signal that is perceived by the user as originating in one or more locations in space distinct from the location of the electroacoustic transducers. (Controller 110, in this example, is connected to electroacoustic transducer 106, 108 via a wire that extends through headband 114.) The received audio signal can include any suitable source of audio, including multi-channel and/or object audio, as well as general audio content (not limited to music), and audio for general-use contexts (audio for video, communications, gaming etc).

For the purposes of simplicity and to emphasize the more relevant aspects of headphones 100, certain features of the block diagram of FIG. 1 have been omitted, such as, for example, a Bluetooth system-on-chip, a battery, etc. Further, although FIG. 1 depicts a pair of over-the-ear headphones, it should be understood that headphones 100 can be any suitable form factor including in-ear headphones, on-ear headphones, open-ear headphones, earbuds, etc.

Controller 110 comprises a processor 116 and a memory 118 storing program code for execution by processor 116 to perform the various functions for providing the spatialized audio as described in this disclosure, including, as appropriate, the steps of method 1000, described below. It should be understood that the processor 116 and memory 118 of controller 110 need not be disposed within same housing, such as part of a dedicated integrated circuit, but can be disposed in separate housings. Further, a controller 110 can include multiple physically distinct memories to store the program code necessary for its functioning and can include multiple processors 116 for executing the program code. The various components of controller 110, further, need not be disposed in the same ear cup (or corollary part in other headphone form factors) but can be distributed between ear cups. For example, each of ear cups 102 and 104 can include a processor and a memory working in concert to perform the various functions for providing the spatialized audio as described in this disclosure, the processor and memory in both ear cups 102, 104 forming the controller.

As described above, sensor 112 generates a sensor signal representative of an orientation of the user's head. In an example, sensor 112 is an inertial measurement unit used for head tracking; however, it should be understood that sensor 112 can be implemented as any sensor suitable for measuring the orientation of the user's head. Further, sensor 112 can comprise multiple sensors acting in concert to generate the sensor signal. Indeed, an inertial measurement unit itself typically includes multiple sensors—e.g., accelerometers, gyroscopes, and/or magnetometers acting in concert to generate the sensor signal. The sensor signal representative of the orientation of the user's head can be a data signal that that represents orientation directly, e.g., as changes in pitch, roll, and yaw, or can contain other data from which orientation can be derived, such as the specific force and angular rate of the user's head. In addition, the sensor signal can itself be comprised of multiple sensor signals, such as where multiple separate sensors are used to measure the orientation of the user's head. In an example, separate inertial measurement units can be respectively disposed in ear cups 102, 104 (or corollary part in other headphones form factors), or any other suitable location, and together form sensor 112 and the signals from the separate inertial measurement units form the sensor signal.

Controller 110 can be configured to generate the audio signal in one or more modes. These modes include, for example, an active noise-reduction mode or a hear-through mode. In addition, controller 110 can produce spatialized audio in a mode that fixes the virtualized soundstage in space (e.g., in front of the user) and does not change the perceived location of the virtualized soundstage in response to the motion of the user's head, or only changes it in response to the user spending a predetermined period of time facing a direction that is greater than a predetermined angular rotation away from the virtual soundstage. For the purposes of this disclosure, this will be referred to as a "room-fixed" mode, referring to the fact that the virtual soundstage is perceived as fixed in place in the room. Additional details regarding the room-fixed mode are described in U.S. patent application Ser. No. 16/592,454 filed Oct. 3, 2019, titled SYSTEMS AND METHODS FOR SOUND SOURCE VIRTUALIZATION, which is published as U.S. Patent Application Publication No. 2020/0037097; and U.S. Patent Application Ser. No. 63/415,783 filed Oct. 13, 2022, titled SCENE RECENTERING, the complete disclosures of which are incorporated herein by reference. The room-fixed mode is, as described above, best suited for user's that are relatively stationary, such as sitting at a desk, and is ill-suited for active user's that are, for example, walking or running. To address this, controller 110 is programmed to operate, either by user selection or through some trigger condition, in a "head-fixed" mode, which maintains the virtual soundstage at a point fixed in space (similar to the room-fixed mode, referred to in this disclosure as "static phase" of the head-fixed mode) until a predetermined condition is met, at which point the virtual soundstage can be dynamically rotated following the rotation of the user's head (referred to in this disclosure as the "dynamic phase" of the head-fixed mode). The details of the head-fixed mode are described in greater detail in connection with FIGS. 2-10.

Figure 2:
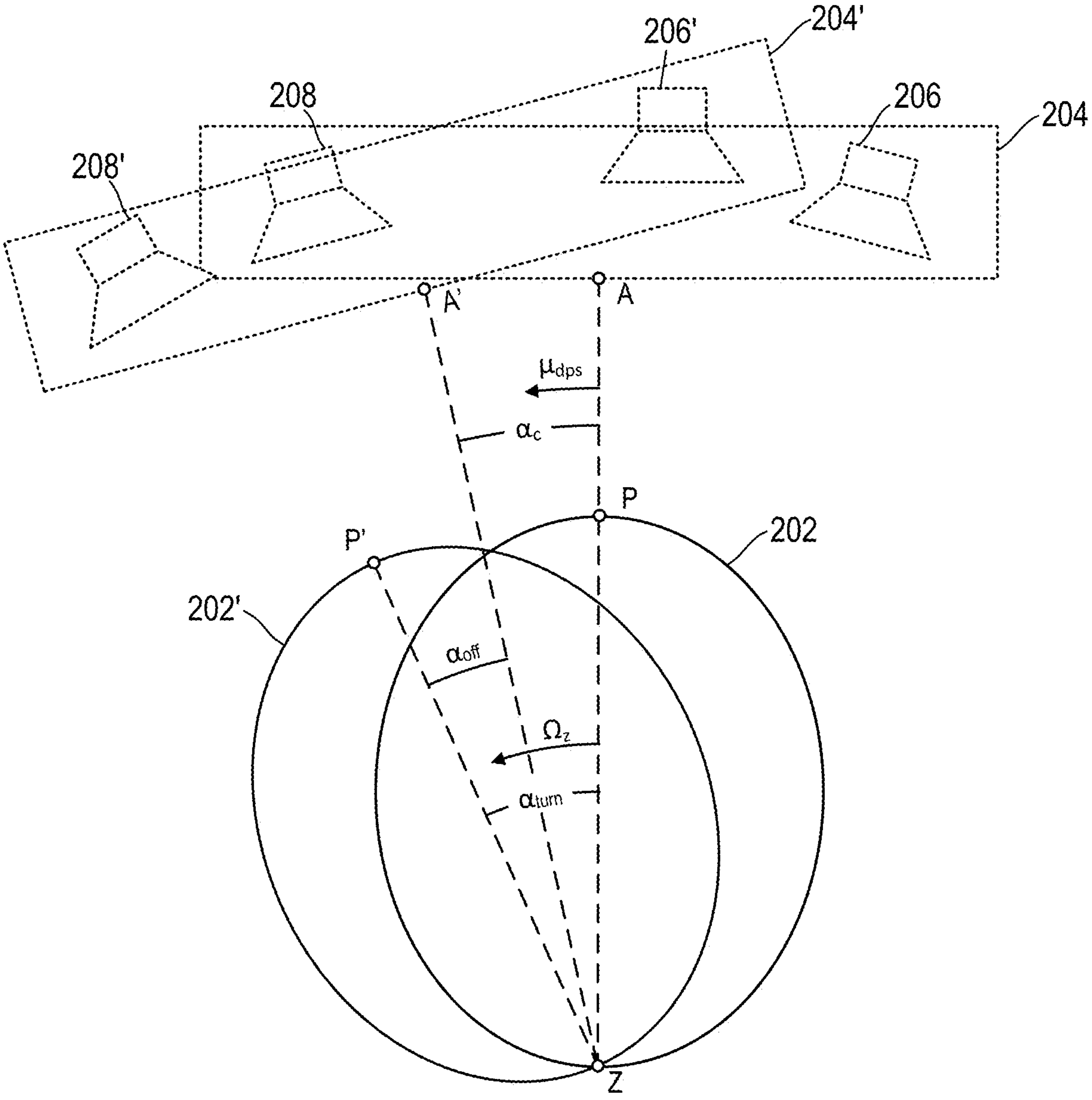
FIG. 2 depicts a top view of a user's head and a virtual soundstage perceived by the user, at two different points of time, according to an example.

Turning to FIG. 2, there is shown a user's head 202 moving from a first orientation at time $t_0$, to a second orientation, denoted 202', at time $t_1$. While headphones 100 are omitted from FIG. 2 so that various features and angles can be more clearly seen, it should be understood that headphones 100 are worn on user's head 202 at both time $t_0$ and $t_1$. The user perceives a virtual sound stage 204, based on spatialized acoustic signal generated by headphones 100. Virtual soundstage 204 comprises one or more virtualized speakers (also referred to as "virtualized sources"), here depicted as virtualized speakers 206, 208. Although two virtual speakers are shown, it will be understood that, in various alternative examples, any number of virtualized speakers can be created from the spatialized acoustic signal (according to the spatialized audio signal produced by controller 110). Further, although virtualized speakers 206, 208 are shown disposed symmetrically in front of (i.e., about the longitudinal axis, extending in FIG. 2 from the Z-axis to Point P) the user's head 202, it should be understood that, in various examples, the virtualized speakers can be distributed asymmetrically with respect to the front of the user's head. The production of virtualized speakers is generally understood, and so a more detailed description will be omitted here.

For the purposes of this disclosure, and for the sake of simplicity, the location of a virtual soundstage and virtual speakers will often be discussed as though the virtual soundstage or virtual speakers are physically disposed at a given location. Even where not explicitly stated, it should be understood that the location of the virtual soundstage or the virtual speakers is a perceived location only. Stated differently, to the extent that the virtual soundstage or virtual speakers are described as having a physical location in space, it refers only to the perceived location of the virtual soundstage or virtual speakers and not to an actual location in space.

The location of the virtualized speakers 206, 208 can be a location at which the virtualized speakers 206, 208 were initialized. The initialization of the speakers can occur, for example, when the user first selects a spatialized audio mode (such as room-fixed mode or head-fixed mode) and can be initially placed in front of the user (e.g., as shown in FIG. 2), although it is conceivable the virtualized speakers 206, 208 could be initialized elsewhere. Indeed, it is conceivable that the initial locations (and number) of virtualized speakers can be selected by a user, such as through a dedicated mobile application or web interface accessible via a computer or mobile device.

As described above, after the virtualized speakers are initialized, controller 110 maintains the virtual soundstage 204, in the static phase, at the same location until one or more predetermined conditions are satisfied. Once at least one of the predetermined conditions are met, the spatialized audio signal can be adjusted by controller 110, in the dynamic phase, such that virtual soundstage 204 rotates to track the movement of the user's head. The movement of virtual soundstage 204 is represented, in FIG. 2, by the rotation of virtual soundstage 204, depicted as virtual soundstage 204'. More particularly, as the user's head 202 rotates to the second orientation at $t_1$, virtual soundstage 204 tracks the location of user's head 202 but, typically, with some lag. Thus, at time $t_1$, virtual soundstage 204' trails, in angle, user's head 202'. Some lag here is desirable as it maintains the illusion of a virtual soundstage. If the virtual soundstage perfectly tracks the user's head without any lag, the perception of the virtual soundstage will "collapse" inside the user's head since there will no longer be a distinction between the motion of the user's head and the perceived motion of the virtual speakers.

The rotation of the virtual soundstage 204 is accomplished by the rotation of each virtual speaker 206, 208 (as the virtual soundstage 204 is comprised entirely of the collection of virtual speakers). Stated differently, as virtual soundstage 204, from time $t_0$ to time $t_1$ angularly rotates angle $\alpha_c$ about the Z-axis, each virtual speaker 206, 208 likewise rotates angle $\alpha_c$ about the Z-axis from its initial position at time $t_0$ to its position at time $t_1$. For the purposes of this disclosure, however, the rotation of virtual soundstage 204, is described with respect to a single reference point, denoted as point A in FIG. 2, and referred to as the "audio frame." Thus, the virtual soundstage dynamically tracking the user's head is described with respect to the rotation of the audio frame A following the rotation of user's head 200. In the examples shown, audio frame A is initialized to be aligned with the longitudinal axis Z-P of the user's head 202. However, since audio frame A is a reference point for the describing the rotation of virtual soundstage 204, it should be understood that any suitable reference axis, i.e., from which an angular offset between user's head 202 and virtual soundstage 204 can be measured, can be used.

Virtual soundstage 204 (and consequently, each virtual speaker 206, 208) angularly rotates about the Z-axis. Typically, the Z-axis corresponds to the axis about which the user's head rotates, otherwise the virtual soundstage 204 will not be perceived as remaining a fixed distance from the user throughout the course of a rotation. In practice, this axis can be approximated to any point at which the distance changes over the course of the rotation are not noticeable to a user.

The virtual soundstage 204 tracking the user's head movement is accomplished by rotating virtual soundstage 204 to reduce an angular offset between virtual soundstage 204 and the orientation of the user's head. This is shown in FIG. 2 as the offset angle $\alpha_{off}$, which is the difference between the turn angle $\alpha_{turn}$ of the user's head 202 (i.e., the angle between the orientation of the user's head 202 at time $t_0$ and the orientation of the user's head 202' at time $t_1$), and the angle of rotation $\alpha_c$ of virtual soundstage (i.e., the angle between the orientation of the virtual soundstage 204 at time $t_0$ and the orientation of the virtual soundstage 204' at time $t_1$). Thus, the direction of movement of virtual soundstage 204 is selected to reduce large angular offsets between turn angle $\alpha_{turn}$ and angle of rotation $\alpha_c$.

Once at least one of the predetermined conditions are met, virtual soundstage begins moving toward the current orientation of the user's head 202 at an angular velocity of $\mu_{dps}$ degrees per second (the selection of a value for $\mu_{dps}$ can be a dynamic process and will be described in more detail below). The angle of rotation $\alpha_c$ can be given by integrating the value of $\mu_{dps}$ per sample from time $t_0$ to $t_1$.

$$\alpha_c(t_0, t_1) = \int_{t_0}^{t_1} \mu_{dps}(s)ds \tag{1}$$

Similarly, the turn angle $\alpha_{turn}$ of user's head 202 can be found by integrating the measured angular velocity of the user's head, $\Omega_z$ (in degrees per second) measured each sample by controller 110, according to the input from sensor 112, from time $t_0$ to $t_1$.

$$\alpha_{turn}(t_0, t_1) = \int_{t_0}^{t_1} \Omega_Z(s)ds \tag{2}$$

Accordingly, the angular offset $\alpha_{off}$ at time t can be found by integrating the difference between the angular velocity $\Omega_z$ of user's head 202 and the angular velocity $\mu_{dps}$ of soundstage 204 from time $t_0$ to t1 and summing the result with the offset that existed at time $t_0$.

$$\alpha_{off}(t_1) = a_{off}(t_0) + \int_{t_0}^{t_1} (\Omega_z(s) - \mu_{dps}(s))\, ds \tag{3}$$

Equation (3) can be rewritten as the sum of the offset at time $t_0$ with the difference between turn angle $\alpha_{turn}$ of user's head 202 and the angle of rotation $\alpha_c$ of virtual sound stage 204 from time $t_0$ to $t_1$.

$$\alpha_{off}(t_1) = a_{off}(t_0) + \alpha_{turn}(t_0, t_1) - \alpha_c(t_0, t_1) \tag{4}$$

As described above, virtual soundstage 204 remains fixed in space while certain predetermined conditions are not met. Such predetermined conditions can be, for example, an angular bound (such as a wedge or a cone) disposed about the user's head to determine whether the user's head has turned beyond a predetermined maximum, and whether the angular jerk of the user's head exceeds a threshold to determine whether user's head is quickly turning, an early indication of a turn that will exceed the angular bound. Other predetermined conditions are conceivable and within the scope of this disclosure.

Figure 3:
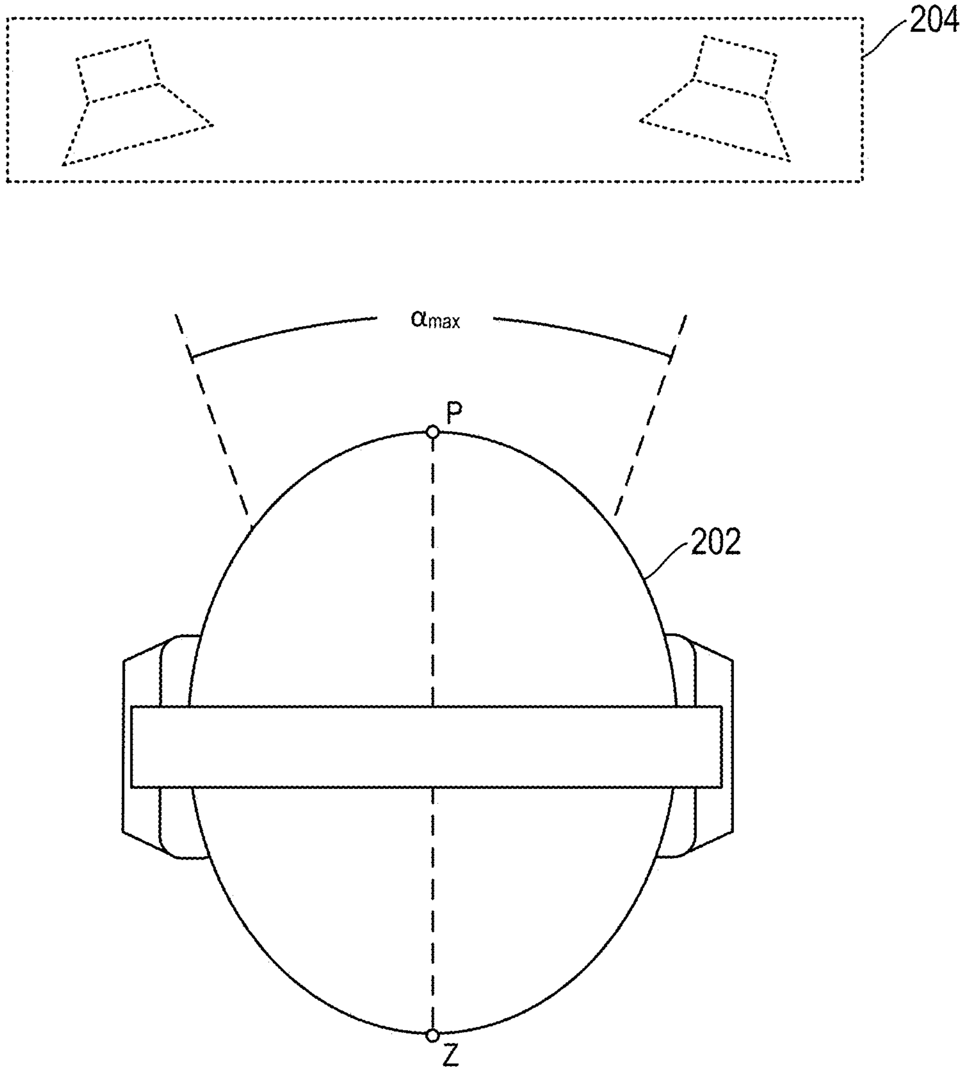
FIG. 3 depicts a top view of a user's head wearing a pair of headphones, a virtual soundstage perceived by the user, and an angular bound for entering a dynamic phase of a spatialized audio mode, according to an example.

Turning to FIG. 3, there is shown a first of such predetermined conditions, an angular bound shown as angle $\alpha_{max}$. The angular bound $\alpha_{max}$ is depicted as a two-dimensional cone (also referred to as a wedge) that corresponds to whether the user's head has traveled a maximum permissible yaw (i.e., rotated to a maximum possible extent) before virtual soundstage 204 is adjusted to realign audio frame A with the longitudinal axis Z-P of the user's head. Angular bound $\alpha_{max}$ can cover rotational maximum of, e.g., 50°, although its width is a design choice and, in other examples, can have other suitable values. In this example, the two-dimensional cone has its vertex at the axis of rotation Z, so that the longitudinal axis Z-P is entirely within angular bound $\alpha_{max}$ or entirely outside of it.

While FIG. 3 depicts the longitudinal axis Z-P as the reference axis used to determine whether an orientation of the user's head has exceeded angular bound $\alpha_{max}$ any suitable reference axis, or reference point, can be used to compare the orientation of the user's head against the angular bound. In one example, the reference point P, representing the front of the user's head, can be used in place of longitudinal axis Z-P. However, it is not necessary that the reference point lie on the longitudinal axis Z-P, nor is it necessary that the same reference axis be used as used for determining the offset or alignment of the virtual soundstage 204 as is used for comparing the orientation against angular bound $\alpha_{max}$. If a different reference axis or a reference point of the longitudinal axis is used, it may, however, be necessary to adjust the location or orientation of angular bound $\alpha_{max}$ to account for the differences in initial direction or location of the reference axis/point used.

However, employing the same reference axis for offset of virtual soundstage 204 and detecting when the orientation of the user's head exceeds the angular bound allows angular offset doff to be used as a proxy for reference axis of the user's head 202. In other words, if the same reference axis is used for determining the alignment of the virtual soundstage 204 with the user's head 202 and for determining whether the user's head 202 exceeds angular bound $\alpha_{max}$, then while the user's head 202 remains within the angular bound $\alpha_{max}$, angular offset doff is equal to the distance from the center of the angular bound $\alpha_{max}$, permitting a certain economy of calculations. (This assumes that the angular bound is disposed symmetrically around the reference axis, although this would typically be the case.)

It should further be understood that other suitable shapes of angular bounds can be used. For example, a three-dimensional cone can be used to determine whether the pitch of user's head 202 exceeds a bound in the vertical dimension (i.e., the pitch of the user's head) can be used in place of the two-dimensional cone.

While the user's head remains within the maximum angular bound $\alpha_{max}$, controller 110 operates in the static phase of the head-fixe mode, meaning that the user perceives virtual soundstage 204 as being fixed in space. This is equivalent to operating in the room-fixed mode described above. In general, during this period, virtual soundstage 204 angular velocity $\mu_{dps}$ is either 0 deg/s or is held at a very low value to compensate for drift in the sensor 112 (so the user will not perceive any motion in the virtual soundstage 204).

Figure 4A:
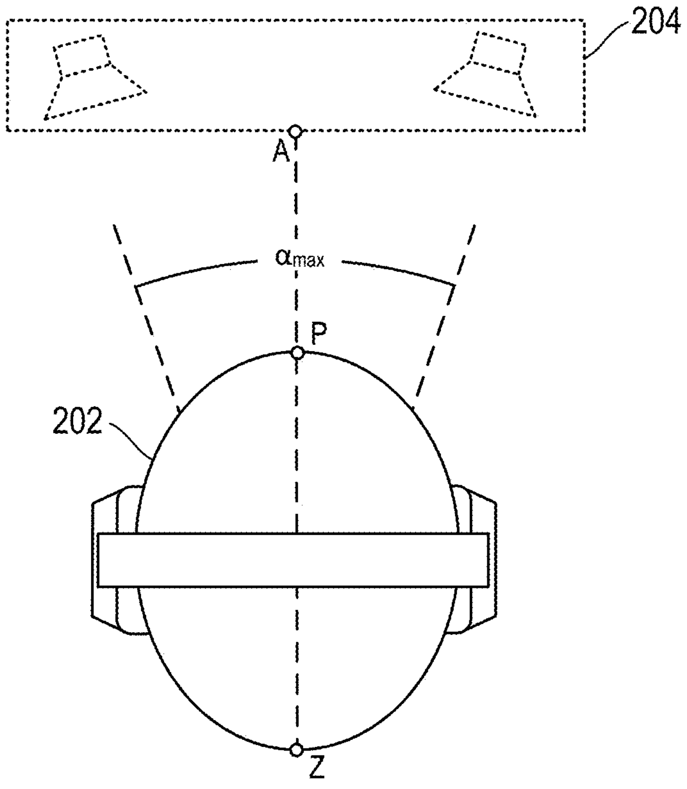
FIGS. 4A-4F depict a top view of a user's head wearing a pair of headphones, a virtual soundstage perceived by the user, and an angular bound for entering a dynamic phase of a spatialized audio mode, at various points of a head turn, according to an example.
Figure 4B:
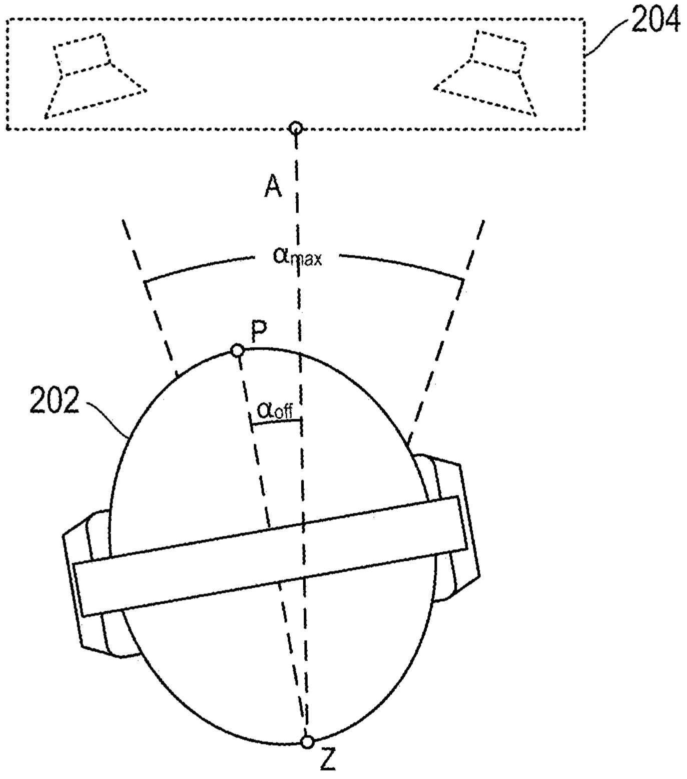

Upon determining that the user's head is outside of angular bound $\alpha_{max}$, the angular velocity $\mu_{dps}$ of virtual soundstage 204 is increased in a direction that reduce the angular offset doff, that is, in the direction of the angular velocity (2, of the user's head 202. This is shown in more detail in FIG. 4A-4F, which together depict the rotation of a user's head, and the response, in turn, of the virtual soundstage 204. In FIG. 4A, the orientation of the user's head, as denoted by the longitudinal axis Z-P is pointed upward on the page and is within the angular bound $\alpha_{max}$, and so controller 110 remains in the static phase and virtual soundstage 204 remains in its fixed location. In FIG. 4B, the user's head has begun to turn to the left in the page, but longitudinal axis Z-P remains within angular bound $\alpha_{max}$, so controller 110 remains in the static phase and the user continues to perceive the virtual soundstage 204 as fixed in the same location. (It should be understood that adjustments to the spatialized audio signal, based on the changes in orientation of the user's head 202, are required so that the virtual soundstage 204 is perceived as existing in the same location in space.)

Figure 4C:
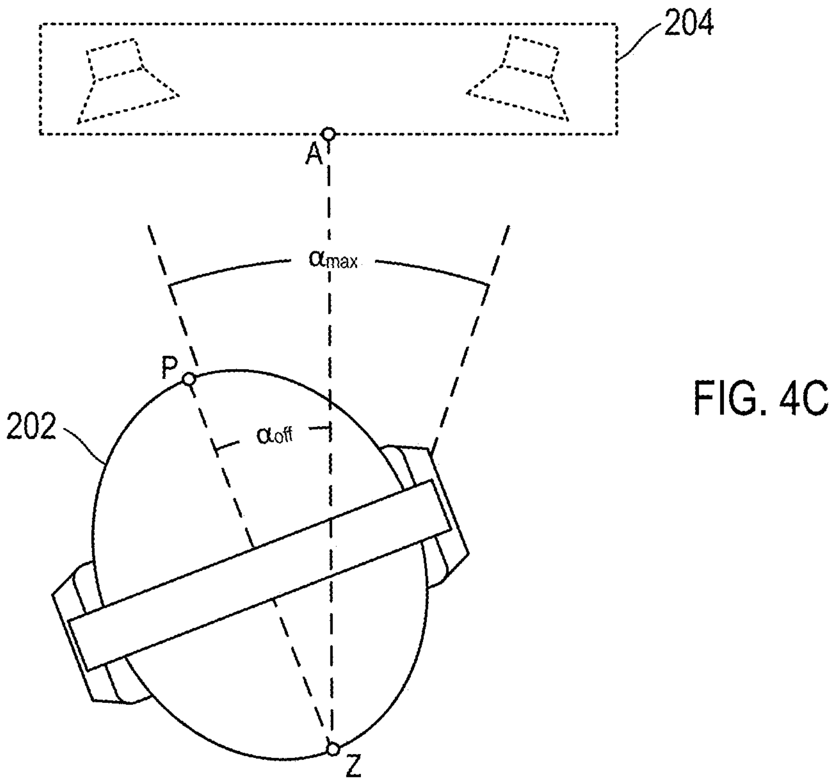
Figure 4D:
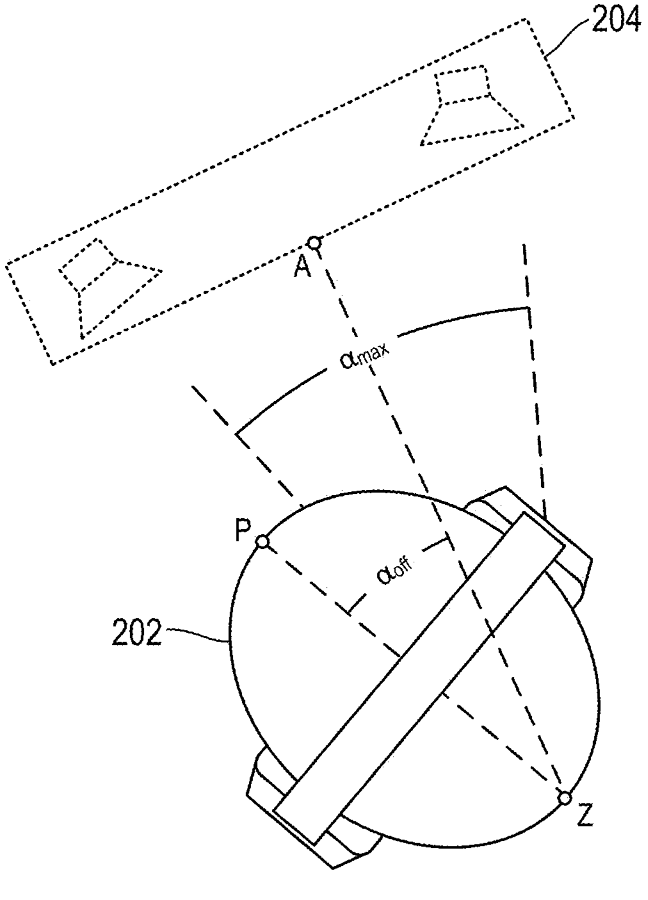
Figure 4E:
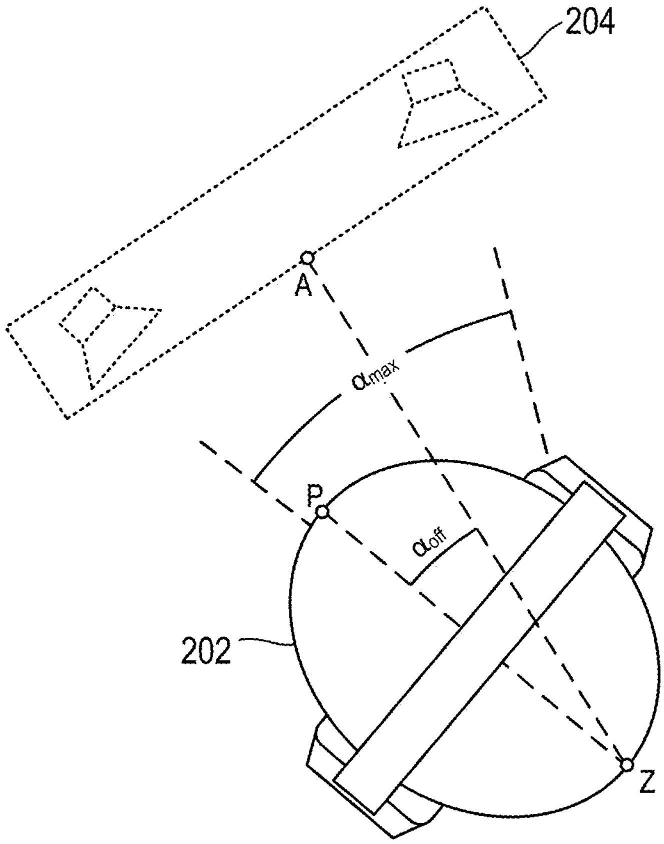
Figure 4F:
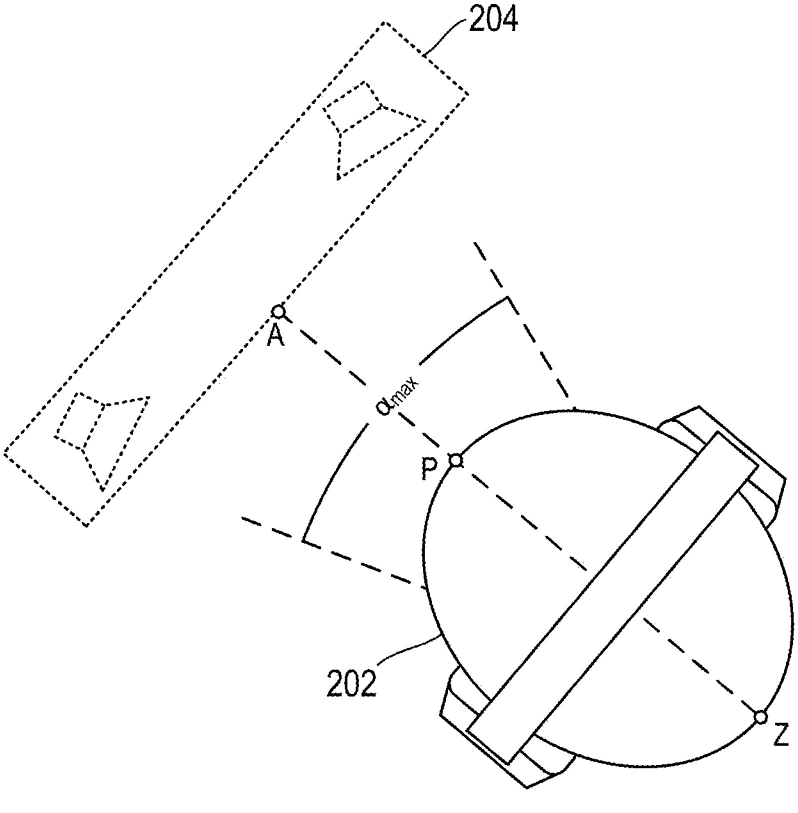

In FIG. 4C, the longitudinal axis Z-P has exited angular bound $\alpha_{max}$, and, in response, controller 110 enters the dynamic phase of the head-fixed mode. FIG. 4C, however, represents the first sample in which the orientation of the user's head is measured as exceeding angular bound $\alpha_{max}$ and thus virtual soundstage 204 has not yet begun to track the movement of user's head 202. As shown FIG. 4D, user's head 202 has continued to turn toward the left, and virtual soundstage 204 has begun to track the movement of the user's head, similarly shifting left, although there is some lag—i.e., offset angle $\alpha_{off}$—between the angle of the audio frame A and longitudinal axis Z-P. Angular bound $\alpha_{max}$ is similarly rotated about the Z axis the same angle of rotation $\alpha_c$ virtual soundstage 204 is rotated. In FIG. 4E, angular bound $\alpha_{max}$, continuing its rotation, has caught up to and overtaken longitudinal axis Z-P such that longitudinal axis Z-P is once again in angular bound $\alpha_{max}$. In FIG. 4F, the soundstage (and angular bound $\alpha_{max}$) has reached the end location of the user's head turn, and thus virtual sound stage 204 is again aligned with longitudinal axis Z-P, rendering offset angle $\alpha_{off}$ 0° or to within some predetermined tolerance. (Generally, to be considered "aligned," for the purposes of this disclosure, the offset need only be brought to within a predetermined degree, which is a design choice that dictates how tightly virtual sound stage 204 is aligned to the user's head 202. Typically, the predetermined degree is selected to be a value not noticeable to a user, in order to maintain the perception that the audio frame has been adjusted to its previous position relative to the user's head.)

The controller will continue in the dynamic phase until the second predetermined condition is met. In one example of such a second predetermined condition, virtual soundstage 204 tracks the movement of user's head 202 for a predetermined length of time after the user's head returns to angular bound $\alpha_{max}$. For example, as shown in FIG. 4E, longitudinal axis Z-P has just returned to angular bound $\alpha_{max}$ (because angular bound $\alpha_{max}$ has rotated toward it), initiating a predetermined period of time before the tracking of user's head ceases and virtual soundstage 204 fixes in place (i.e., enters the static phase). In an example, the predetermined period of time can be 0.5 seconds, although other suitable lengths of time can be used. The predetermined period of time can be selected so as to allow the tracking of user's head 202 to continue until virtual soundstage 204 is again aligned with longitudinal axis Z-P, as shown in FIG. 4F.

Figure 5A:
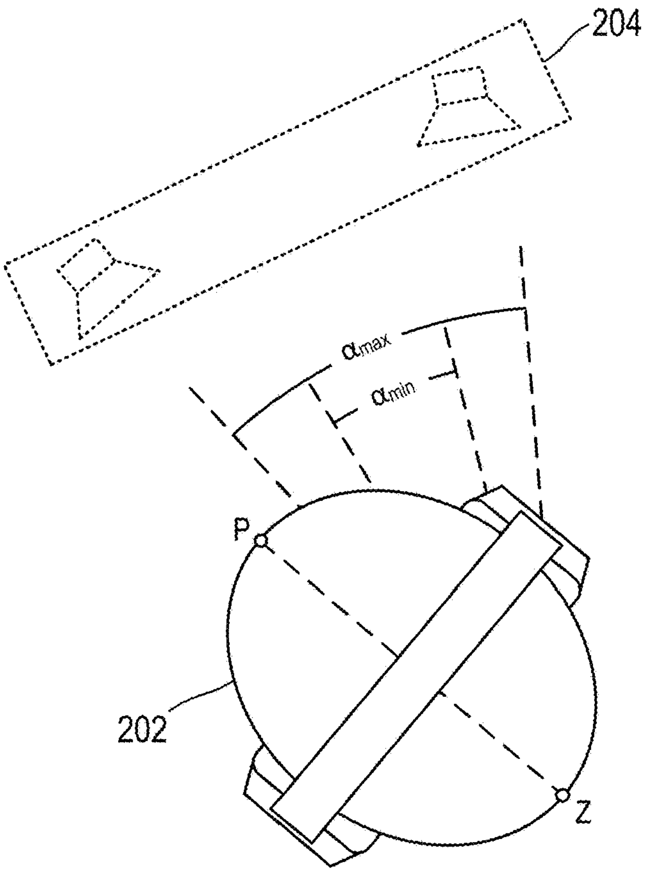
FIGS. 5A-5C depict a top view of a user's head wearing a pair of headphones, a virtual soundstage perceived by the user, and angular bounds for entering and exiting a dynamic phase of a spatialized audio mode, at various points of a head turn, according to an example.
Figure 5B:
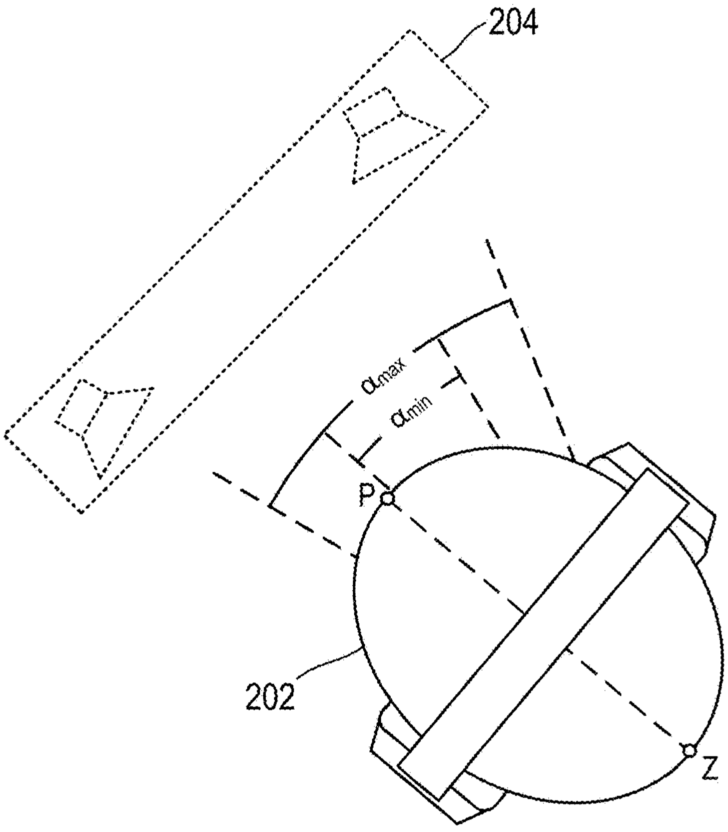

In an alternative example, the second predetermined condition can be a separate angular bound, narrower than angular bound $\alpha_{max}$, established to determine when virtual soundstage 204 is aligned with longitudinal axis Z-P. Stated differently, in this example, angular bound $\alpha_{max}$ is used to determine when virtual soundstage 204 begins tracking user's head 202 (i.e., enters the dynamic phase), but a narrower angular bound is used to determine when virtual soundstage 204 stops tracking user's head 202 and again becomes fixed in space (i.e., enters the static phase). An example of this is shown in FIGS. 5A and 5B, which show the user's head, having turned to the left (like described in connection with FIGS. 4A-4F), virtual soundstage 204 and angular bounds $\alpha_{max}$ and the narrower $\alpha_{min}$ start tracking to the left in response to the user's head turning beyond angular bound $\alpha_{max}$. In FIG. 5A, virtual soundstage 204, though tracking the user's head 202 turn, is not yet aligned with longitudinal axis Z-P. Longitudinal axis Z-P is outside both angular bound $\alpha_{max}$ and angular bound $\alpha_{min}$.

Figure 5C:
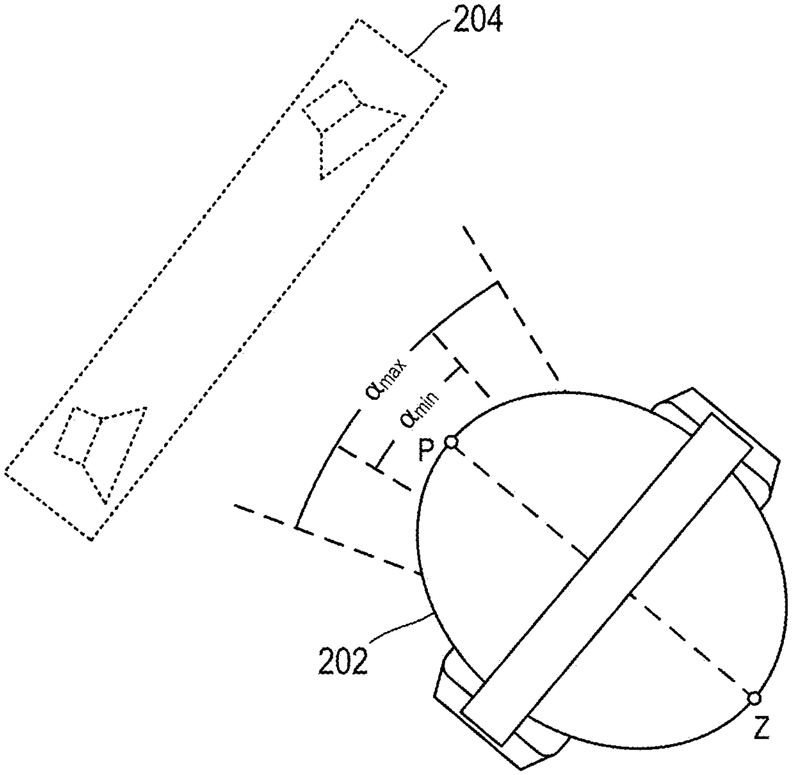

In FIG. 5B, user's head 202 is within angular bound $\alpha_{max}$ but not yet within angular bound $\alpha_{min}$, thus the virtual soundstage continues to track the movement of user's head 202. In FIG. 5C, longitudinal axis Z-P is within angular bound $\alpha_{min}$, and thus virtual soundstage 204 ceases to track user's head 202 and controller 110 again enters that static phase. The width of angular bound $\alpha_{min}$ is a design choice that depends on how tightly virtual soundstage 204 is to be aligned with longitudinal axis Z-P. In general, the narrower angular bound $\alpha_{min}$, the more tightly aligned virtual soundstage 204 will be with the front of user's head point P.

Figure 6:
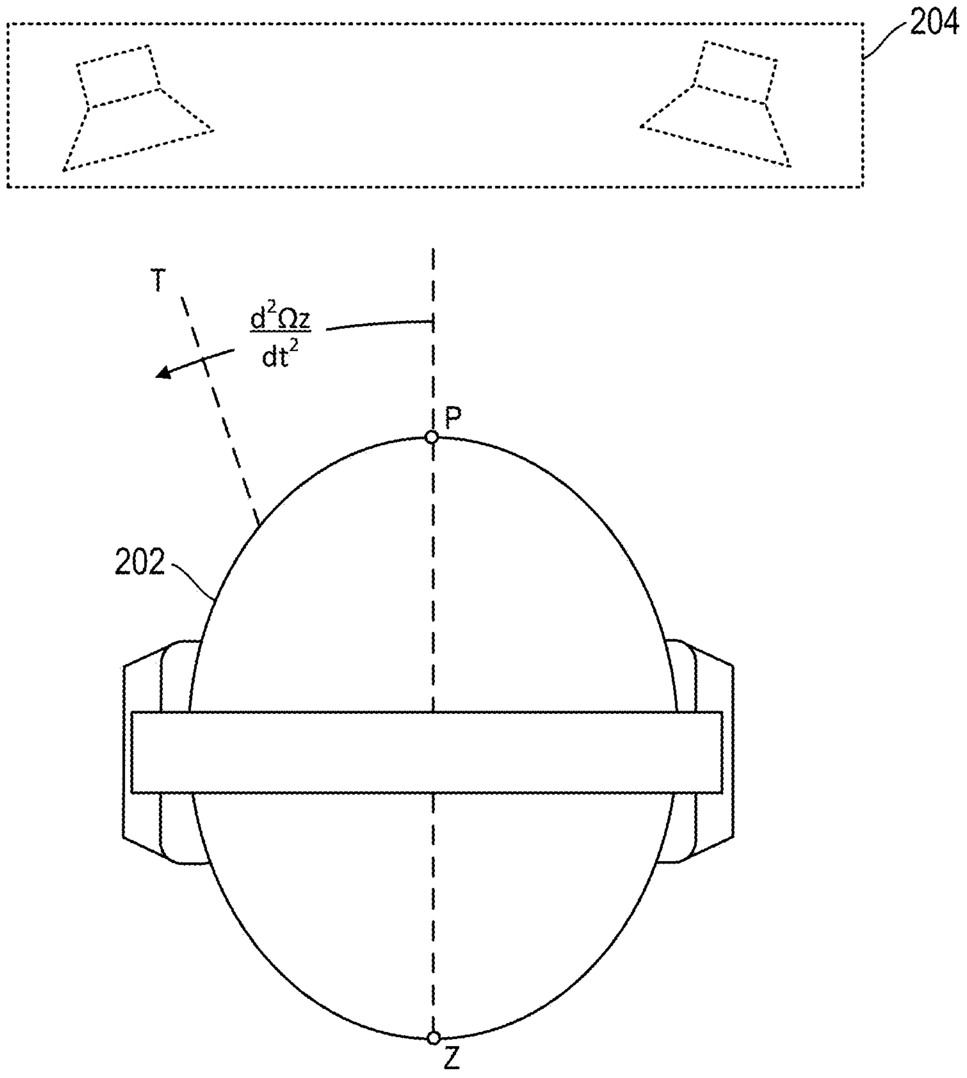
FIG. 6 depicts a top view of a user's head wearing a pair of headphones, a virtual soundstage perceived by the user, and an angular jerk and threshold for entering a dynamic phase of a spatialized audio mode, according to an example.

Turning now to FIG. 6, there is shown a second example of a predetermined condition for enabling of the virtual soundstage 204 tracking. In this example, rather than determining whether a user's head has exceeded an angular bound, controller 110 determines whether the user's head has begun quickly turning in one direction or another, by determining whether the angular jerk—i.e., the rate of change of the acceleration of the user's head—has exceeded a threshold. In FIG. 6, the angular jerk of the user's head 202 is denoted by the curved arrow labeled $$\frac{d^2\Omega_z}{dt^2},$$

with the length of the curved arrow representing the value of the angular jerk with respect to the threshold value, represented by the dashed line labeled T. If the angular jerk exceeds a threshold value, the user's head is turning quickly in a direction, suggesting that the user's head will imminently exceed the angular bound. The angular jerk thus represents an early indication of a head turn that requires adjusting the location of the virtual soundstage 204. The angular jerk can be directly received from sensor 112, but more typically can be calculated by comparing changes in orientation from one sample to the next; although, any suitable method for calculating angular jerk can be used.

Figure 7A:
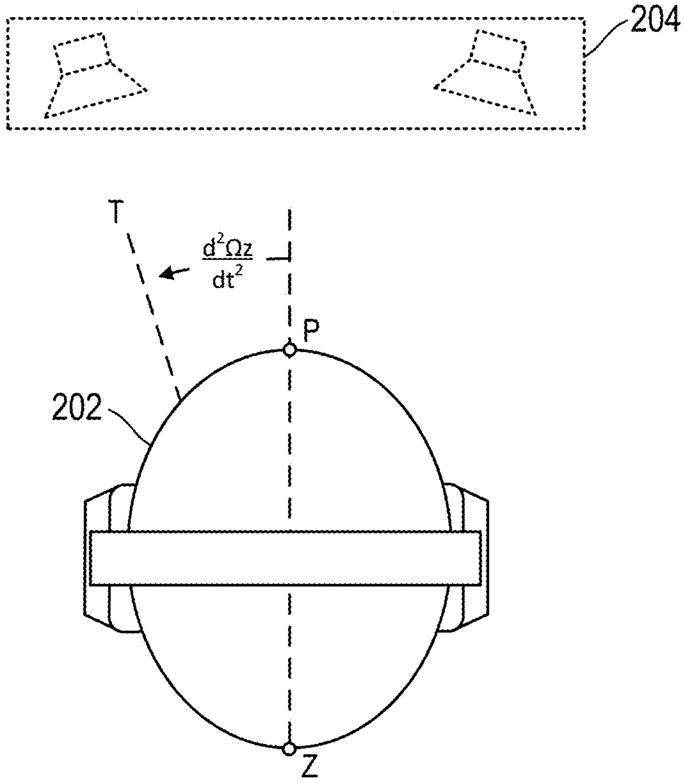
FIGS. 7A-7C depict a top view of a user's head wearing a pair of headphones, a virtual soundstage perceived by the user, and an angular jerk and threshold for entering a dynamic phase of a spatialized audio mode, at various points of a head turn, according to an example.
Figure 7B:
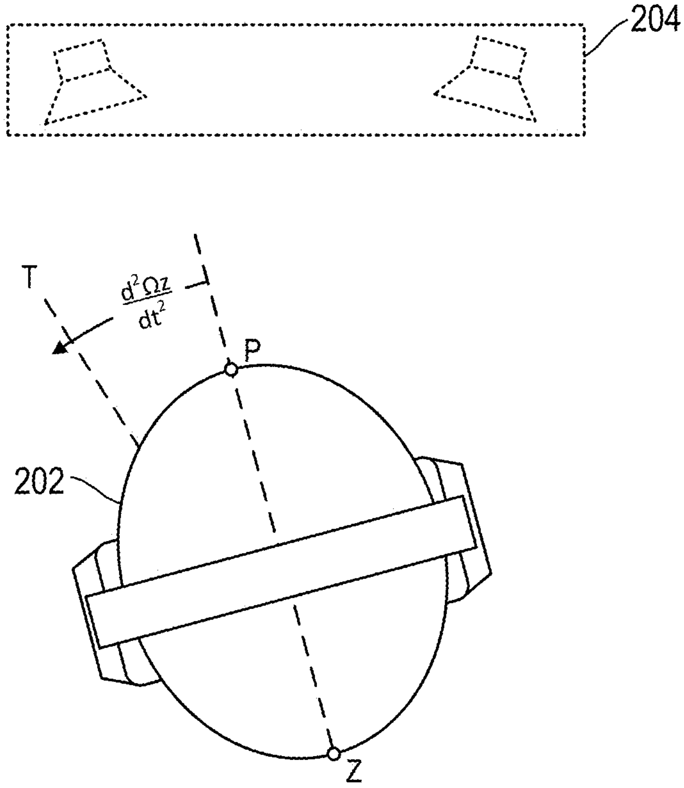
Figure 7C:
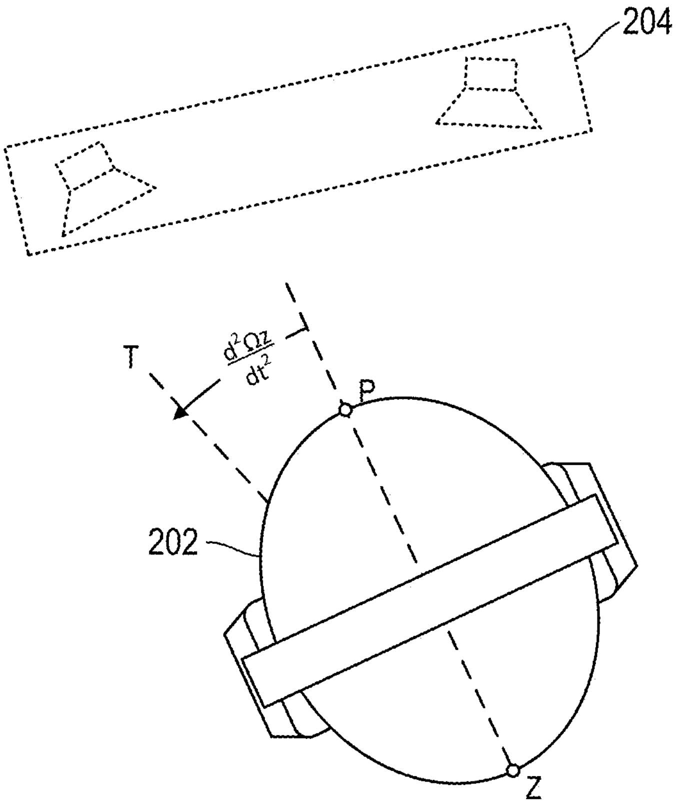

FIGS. 7A-7C depict the adjustment to virtual soundstage following detecting an angular jerk of the user's head 202 that exceeds the predetermined threshold. In FIG. 7A, the user's head 202 has begun turning to the left with an angular jerk denoted by the curved arrow labeled $$\frac{d^2\Omega_z}{dt^2},$$

but has not yet exceeded the threshold; accordingly, controller 110 remains in the static phase and virtual soundstage is perceived as fixed in place. FIG. 7B depicts the first sample at which the measured jerk exceeds the threshold, and so the location of virtual soundstage 204 has not yet begun to be adjusted. FIG. 4C depicts that the location of virtual soundstage 204 has begun to be adjusted, tracking the movement of user's head 202, as a result of the angular jerk exceeding the threshold T. Virtual soundstage 204 tracking user's head 202 can continue until a second predetermined condition is met. Examples of a second predetermined condition include tracking until the user's head 202 returns to an angular bound or returns to an angular bound for a predetermined period of time, as described in connection with FIGS. 4 and 5.

In general, monitoring an angular jerk of user's head 202 is useful for early detection of a head turn, but it will not (by design) detect the slower movements, even movements that result in the user's rotating heavily to the left or right. Accordingly, the angular jerk of user's head 202 is conceived of as being used in tandem with angular bound $\alpha_{max}$, with either the angular jerk exceeding threshold or the orientation of the user's head exceeding the angular bound being sufficient to enter the dynamic phase and adjust the location of virtual soundstage 204; however, it is conceivable that either the angular bound condition or the angular jerk threshold condition could be used as the only predetermined condition for initiating tracking of the user's head. It should further be understood that, instead of or in addition to the two methods described above, any suitable predetermined condition for detecting or predicting rotation of the user's head that exceeds a predetermined extent can be used.

The angular velocity $\mu_{dps}$ of virtual soundstage 204 can be based on the angular velocity of the user's head $\Omega_z$. In general, when soundstage tracking is triggered, the goal is to rapidly cancel large head rotations (so that, typically, the user's perceives the soundstage predominantly in front of user's head 202), and to eliminate the most offensive artifacts of recentering the virtual soundstage, while also permitting some lag to be present so that the illusion of the virtual soundstage is preserved. Applicant has also appreciated that is it typically an unpleasant experience for the soundstage to lag the user's head once the user's head has stopped moving. In other words, audio frame A of virtual soundstage 204, ideally, should align with longitudinal axis Z-P (or other reference as axis) as user's head comes to a stop. Accordingly, to track the motion of the user's head, controller 110 can dynamically adjust the angular velocity $\mu_{dps}$ of virtual soundstage 204, in a manner that is based on the motion of user's head 202 but times the alignment of the virtual soundstage 204 with longitudinal axis Z-P to coincide with the end of the head turn.

Figure 8A:
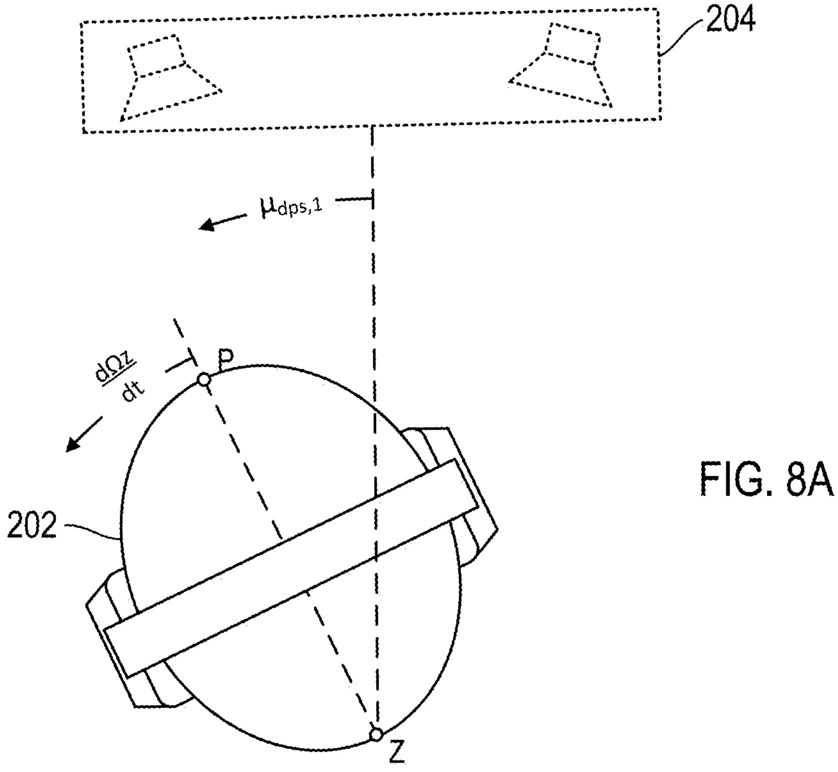
FIGS. 8A-8C depict a top view of a user's head wearing a pair of headphones, a virtual soundstage perceived by the user, an angular acceleration of the user's head, and an angular velocity of the virtual soundstage, at various points of a head turn, according to an example.
Figure 8B:
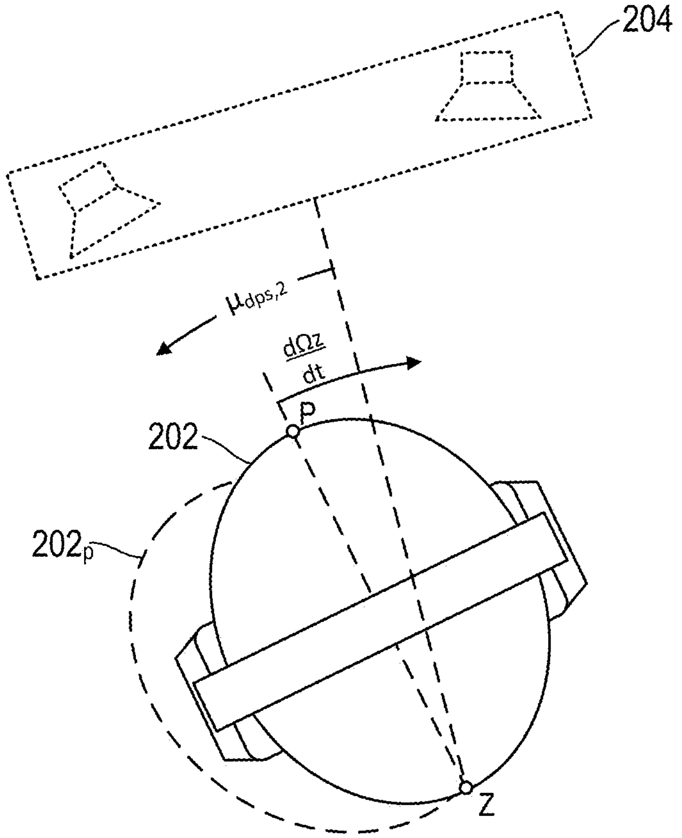
Figure 8C:
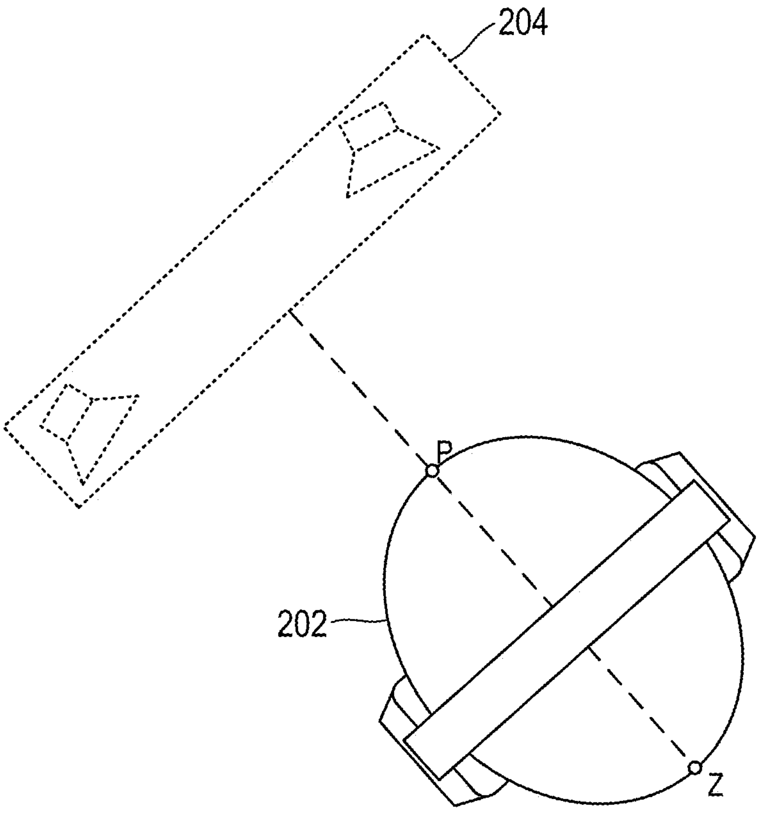

To accomplish these goals, controller 110 can dynamically adjust the angular velocity $\mu_{dps}$ of virtual soundstage 204 according two separate stages: (1) when the user's head is accelerating, and (2) when the user's head is decelerating. FIGS. 8A-8C depict the process of selecting $\mu_{dps}$ in the different stages of the head turn. In FIG. 8A the user's head is moving to the left and is accelerating in this direction, as indicated by the curved arrow labeled $$\frac{d\Omega_z}{dt}.$$

In this stage, the value of angular velocity $\mu_{dps}$ of the virtual soundstage 204—denoted $\mu_{dps,1}$ for the angular velocity in the acceleration stage—is based on the angular velocity of the user's head $\Omega_z$, such that virtual soundstage 204 tracks the user's head 202 while permitting some amount of lag that allows the user to experience some spatial cues of a head turn to relative to virtual soundstage 204 (and preventing the perceived "collapse" of virtual soundstage 204). In an example, this can be accomplished according to the following equation:

$$\mu_{dps,1} = f_{turn,acceleration} * |\Omega_z| \tag{5}$$

where $f_{turn,acceleration}$ represents a scale factor applied to the angular velocity $\Omega_z$ of the user's head and is a design choice.

In FIG. 8B, the user's head is still moving to the left but has begun decelerating, represented by a curved arrow labeled $$\frac{d\Omega_z}{dt}$$

pointing to the right. (It should be understood that a deceleration is an acceleration in a different direction. The deceleration, as described herein, is with respect to the direction of the initial acceleration.) Once the user's head begins decelerating, indicating that the end of the user's head turn is imminent, the final orientation of the user's head at the end of the turn is predicted, represented in dashed lines $\mathbf{202}_p$, and used to select a value for $\mu_{dps,2}$—the angular velocity in the deceleration stage—such that virtual soundstage 204 arrives in front of user's head 202 as the head turn is completed (i.e., virtual soundstage 204 arriving in front of user's head 202 and the user completing the head turn occur at approximately the same time).

This can be accomplished by predicting the time that the user's head turn will complete and setting $\mu_{dps,2}$ so that virtual soundstage 204 traverses the remaining angular offset $\alpha_{off}$ between its current location and the predicted orientation of user's head 202 at end of the turn. For example, if $h_0$ represents the time from the current sample to the end of the head turn, then virtual soundstage must compensate (i.e., traverse), the existing angular offset $\alpha_{off}$ and the additional angular offset $\alpha_{off}$ accrued the current time t to the time that head turn ends $t+h_0$.

The angular velocity of the user's head at a future time h can be approximated from the linear approximation:

$$\Omega_z(t+h) = \Omega_z(t) + h * \frac{d\Omega_z}{dt}(t) \tag{6}$$

(This linear approximation has been truncated to a second term. It should, however, be understood that this Taylor series, and any others described in this disclosure, can be expanded to any number of terms.) Assuming that, at the end of the user's head turn, the angular velocity is zero (given that the user's head has come to a stop), the linear approximation of the $t+h_0$ can be written as follows:

$$\Omega_z(t+h_0) = \Omega_z(t) + h_0 * \frac{d\Omega_z}{dt}(t) = 0 \tag{7}$$

Accordingly, the linear approximation at future time h can be rewritten:

$$\Omega_z(t+h) = \Omega_z(t) * \frac{(h_0 - h)}{h_0} = \Omega_z(t) * \left(1 - \frac{h}{h_0}\right) \tag{8}$$

The additional angle accrued from the current time $t_0$ the time that head turn ends $t+h_0$ can thus be approximated as follows:

$$\int_0^{h_0} \Omega_z(t+h)\,dh = \Omega_z(t) * \frac{h_0}{2} \tag{9}$$

The angular velocity $\mu_{dps,2}(t)$ of the virtual soundstage 204 at future time h can be assumed to have a linear profile, $\Omega_z(t+h_0)$ and thus can be written as a linear approximation:

$$\mu_{dps,2}(t+h) = \mu_{dps,2}(t) * \left(1 - \frac{h}{h_0}\right) \tag{10}$$

And thus, the angle compensated (traversed) by virtual soundstage 204 from the current time to the time that head turn ends $t+h_0$ can be approximated as follows:

$$\int_0^{h_0} \mu_{dps,2}(t+h)\,dh = \mu_{dps,2}(t) * \frac{h_0}{2} \tag{11}$$

The angular velocity of $\mu_{dps,2}(t)$ can be set so that Equation 9 cancels Equation 11 and the angular offset $\alpha_{off}$ that existed at the current time t. In other words, $\mu_{dps,2}(t)$ is selected so that:

$$\mu_{dps,2}(t) * \frac{h_0}{2} = \Omega_z(t) * \frac{h_0}{2} + \alpha_{off}(t) \tag{12}$$

Solving for $\mu_{dps,2}(t)$ yields the angular velocity that results in the virtual soundstage 204 arriving in front of user's head 202 as the head turn is completed:

$$\mu_{dps,2}(t) = \alpha_{off}(t) * \frac{2}{h_0} + \Omega_z \tag{13}$$

This angular velocity can be recalculated for each incoming sample to adjust for changes in the angular velocity of the user's head $\Omega_z$.

Regardless of the stage of user's head turn, the dynamic angular velocity can include a baseline angular velocity $\mu_{baseline}$ that is summed with the calculated values of $\mu_{dps,1}$ and $\mu_{dps,2}$. Baseline angular velocity $\mu_{baseline}$ can be added to account for very slow head turns or the user's head coming back into the angular bound $\alpha_{max}$ with a residual offset. The baseline angular velocity $\mu_{baseline}$ ensures that the virtual soundstage 204 does not stray far from longitudinal axis Z-P (or other reference axis) or erases residual angular offsets. In an example, baseline angular velocity $\mu_{baseline}$ can be 20 deg/sec, although other suitable values are contemplated herein.

Figure 9:
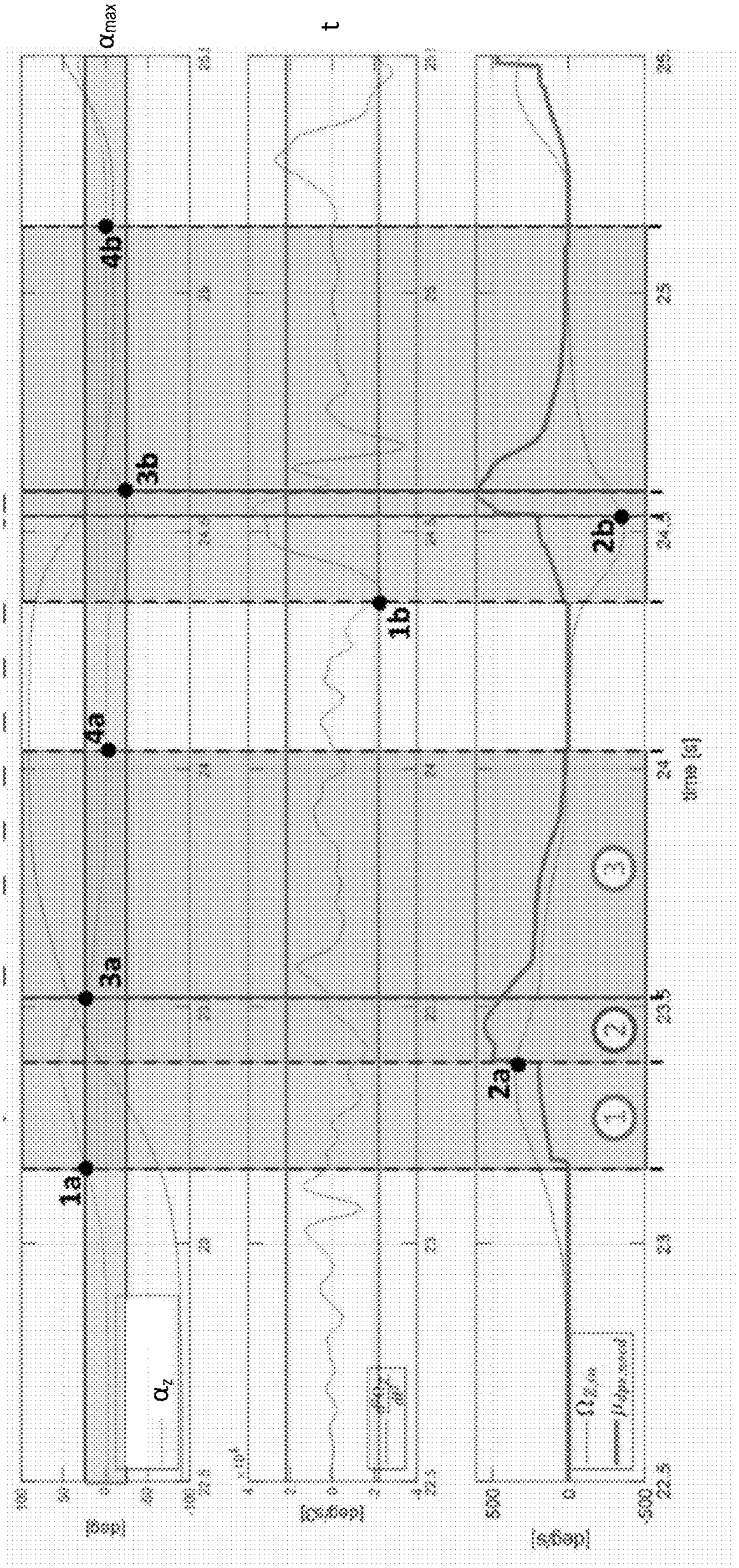
FIG. 9 depicts timing diagram of various signals and values associated with a rotation of a user's head and the resulting dynamic head tracking of the virtual soundstage, according to an example.

Turning to FIG. 9, there is a shown an example timing diagram of various signals and values associated with a rotation of a head turn to demonstrate the detection of the conditions occasioning entering the dynamic phase and the resulting adjustment of the angular velocity $\mu_{dps}$. Beginning with top plot of FIG. 9, there is shown a signal representing the angle of rotation $\alpha_z$ of the user's head 202 about the Z-axis. The top plot of FIG. 9 also depicts the angular bound $\alpha_{max}$, represented as the shaded horizontal bound. As shown in FIG. 9, at point 1*a*, the angle of rotation $\alpha_z$ exits angular bound $\alpha_{max}$, resulting in controller 110 entering the dynamic phase and increasing the angular velocity $\mu_{dps}$ of the virtual soundstage 204 from a zero value to a non-zero value. (Although a zero value of µdps is represented in FIG. 9, it should be understood that, in practice, a non-zero value of angular velocity $\mu_{dps}$ can be maintained during the static phase to eliminate drift of the sensor. The initial dynamic phase is depicted here as the first of two vertical shaded regions, the second shaded region representing a second dynamic phase.) Immediately following 1*a*, angular velocity $\mu_{dps}$ increases based on the angular velocity $\Omega_z$ of the user's head 202. At point 2*a*, the angular acceleration of the user's head 202 begins to decrease, signaling the end of the user's head turn. Based on the predicted end of the head turn, angular velocity $\mu_{dps}$ is abruptly increased, so that virtual soundstage 204 will realign with the reference axis (e.g., the longitudinal axis) of the user's head when the user's head comes to a stop. At point 3*a*, the angle of rotation $\alpha_z$ of the user's head 202 about the Z-axis has returned to inside angular bound $\alpha_{max}$, triggering a predetermined period of time, at the conclusion of which, represented as point 4*a*, the dynamic phase ends and the angular velocity $\mu_{dps}$ of the virtual soundstage 204 again reaches zero.

At point 1*b*, the second dynamic phase begins, this time as a result of the angular jerk of the user's head 202 exceeding the threshold t, both of which are represented in the middle plot of FIG. 9. Once the angular jerk of the user's head 202 exceeds threshold t, the dynamic phase begins as an early detection of the turn of the user's head. Thus, the dynamic phase continues until the user's head 202 exits and returns to angular bound $\alpha_{max}$ at point 3*b* (as shown in the top plot), at which point the predetermined period of time again begins, concluding at the end of the second dynamic phase at point 4*b*. Looking at the angular velocity $\mu_{dps}$ of the virtual soundstage 204 in the bottom plot during the second dynamic phase, at point 1*b*, angular velocity $\mu_{dps}$ again becomes non-zero and has a value based on the angular velocity $\Omega_z$ of the user's head 202. At point 2*b*, the user's head 202 begins to decelerate, resulting in a rapid increase in angular velocity $\mu_{dps}$ to distribute the angular velocity $\mu_{dps}$ in a manner that permits virtual soundstage 204 to realign with the reference axis at the time that the user's head turn ends.

Turning now to FIGS. 10A-10D, there is shown a flowchart of a method 1000 for providing spatialized audio with a virtual soundstage that dynamically tracks the motion of a user's head. Method 1000 can be implemented by a controller (e.g., controller 110) included in a pair of headphones (e.g., headphones 100). The controller can comprise one or more processors and one or more non-transitory storage media storing program for execution by the one or more processors. For example, the controller can comprise two microcontrollers, including a processor and a memory, respectively disposed in an ear cup of the headphones, working in concert to execute the steps of method 1000. The headphones can further include at least a pair of electroacoustic transducers that receive an audio signal from the controller and transduce it into an acoustic signal.

At step 1002, a sensor input signal or a selection of a mode operation is received. In an example, the headphones (and, particularly, the controller) can operate in more than one mode of operation, which include different spatialized audio modes. These modes include, for example, a room-fixed mode, in which the virtual soundstage is perceived as fixed to a particular location in space that does not move in response to the movement of the user's head, except, in certain examples, if the user's head has turned away from the virtual soundstage for at least a predetermined period of time. In the head-fixed mode, as will be described in more detail below (and as described in connection with FIGS. 1-9) the virtual soundstage is fixed to a particular location in space until certain predetermined conditions are met, at which point the virtual soundstage rotates to track the movement of the user's head.

The sensor input signal can, for example, be an input from a sensor such as an inertial measurement unit, that can provide an input indicative of the activity of a user, such as a walking or running, for which the head-tracking mode is better suited (other suitable types of sensors, such as accelerometers, gyroscopes, etc. are contemplated). The sensor input can be received from the same sensor detecting the orientation of the user's head or from a different sensor. In yet another example, the sensor signal can be mediated by a secondary device, such as a mobile phone or a wearable, such as a smart watch, that includes the sensor. Alternatively, an input can be received from a user—e.g., using a dedicated application or through a web interface, or, through a button or other input on the headphones—to directly select between modes.

Step 1004 is a decision block that represents whether the selection of the mode of operation or the sensor signal satisfy the requirements for the head-fixed mode. Upon receiving input of a selection of a mode of operation received from the user, this is typically sufficient to satisfy the requirement, without the need for any further action or decisions. The sensor signal, however, requires certain analysis to determine whether it is indicative of an activity that merits switching to the head-fixed mode. Such analysis can, for example, determine whether the user has taken a predetermined number of steps in a predetermined period of time or whether the user has completed a predetermined number of head turns (as, for example, determined by measuring a reference axis of the user's head with respect to an angular bound) within a predetermined period of time. Other suitable measures of determining that the user is engaged in an activity that would be aided (i.e., made more comfortable) through the implementation of the head-fixed mode are contemplated; indeed, many tests already exist for identifying when a user is engaged in an activity or particular types of activities, any such suitable test can be used. In alternative examples, step 1004 can be conducted by the secondary device (e.g., mobile phone or wearable), which can direct the controller to enter the head-fixed mode or otherwise notify it that a certain activity is occurring, following analysis of the sensor signal by the secondary device.

If the requirements for the head-fixed mode are not satisfied, then at step 1006, controller operates in the room-fixed mode, in which, as described above the virtual soundstage remains fixed except for in narrow circumstances in which the user has faced a different direction for an extended period of time. As mentioned above, additional details regarding the room-fixed mode are described in in U.S. patents application Ser. No. 16/592,454 and 63/415,783 the disclosures of which have been incorporated herein by reference. Further, although the room-fixed mode is listed as the only alternative to the head-fixed mode, it should be understood that the head-fixed mode could one of any number of potential modes, which may or may not be spatialized audio modes. If the requirements for the head-fixed mode are satisfied, then the method progresses to step 1008, shown in FIG. 10B.

At step 1008, the spatial audio signal is output by controller, based on the sensor signal representative of an orientation of the user's head, to a pair of electroacoustic transducers for transduction into a spatialized acoustic signal. The spatialized acoustic signal is perceived as originating from a virtual soundstage that comprises at least one virtual source, each of which the user perceives as being located in a position distinct from the location of the electroacoustic transducers. The virtual sources are also referenced to an audio frame of the virtual soundstage, which is disposed at a first location and aligned with a reference axis of the user's head. In other words, the audio frame is used as a singular point to describe the location and rotation of the virtual soundstage. In one example, the longitudinal axis of the user's head can be used as the reference axis, however the reference axis can be any suitable axis for determining an angular offset between the user's head and the virtual soundstage, as the user's head and the virtual soundstage rotate in the manner described below.

The position of the current location depends on the manner and time the head-fixed mode was selected in step 1004, as the spatialized audio signal can be initialized at step 1008 or it can be initialized earlier, such as in connection with the room-fixed mode. In the former instance, the spatialized audio signal is initialized at step 1008, and is thus determined according to user input, or, automatically, according to the direction the user is facing at step 1008. In the latter instance, the first location can depend upon the location of the audio frame, determined in connection with the room-fixed mode, which can be where the room-fixed mode was initialized or to the location it was adjusted.

Step 1010 is a decision block that determines whether a characteristic of the user's head satisfies at least one predetermined condition. Such predetermined conditions can be, for example, whether the orientation of the user's head is outside a predetermined angular bound or whether the angular jerk of the user's head exceeds a predetermined threshold.

Figure 10A:
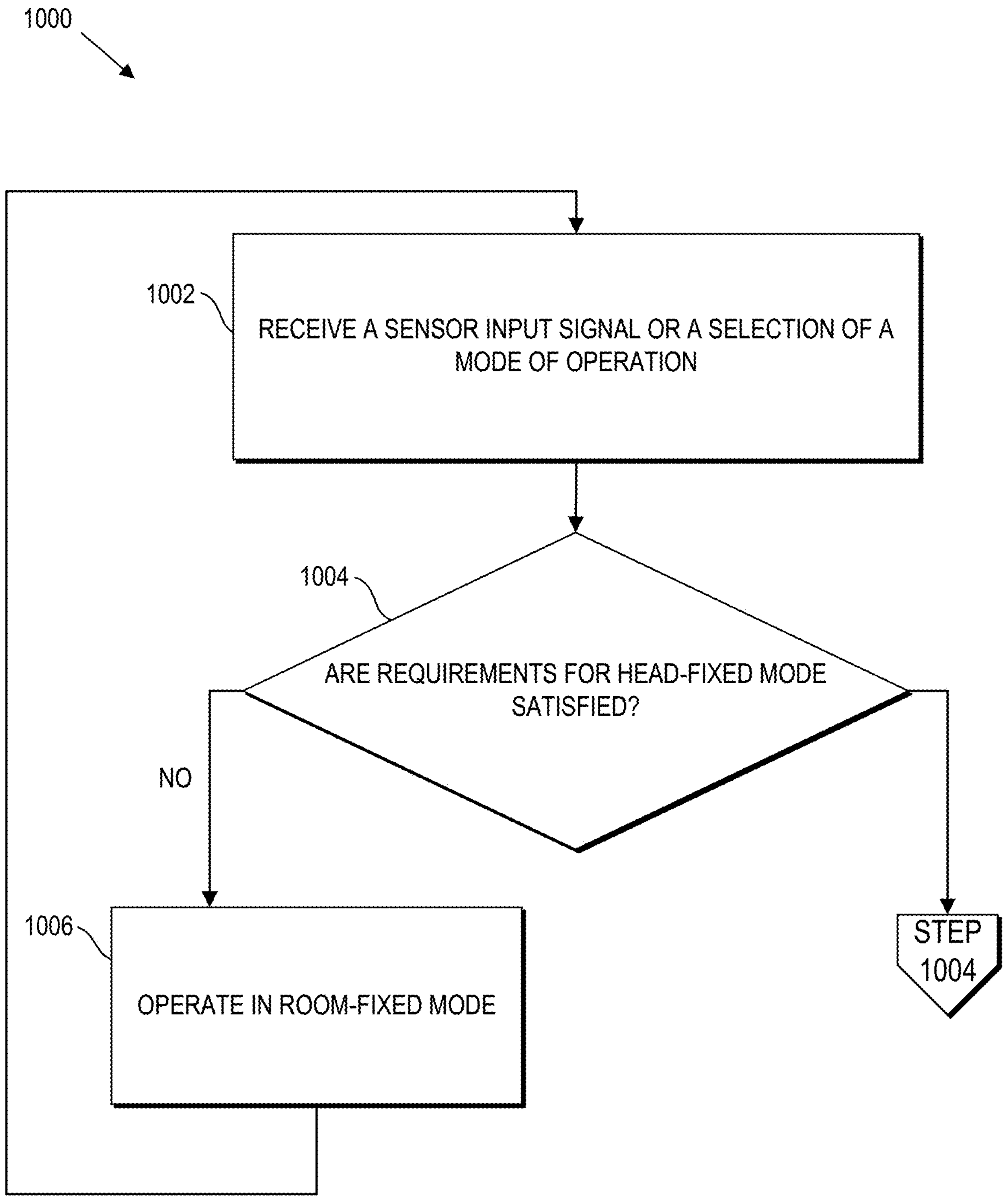
FIG. 10A-10F depict a flowchart of a method 1000 providing spatialized audio with a virtual soundstage that dynamically tracks the motion of a user's head.
Figure 10B:
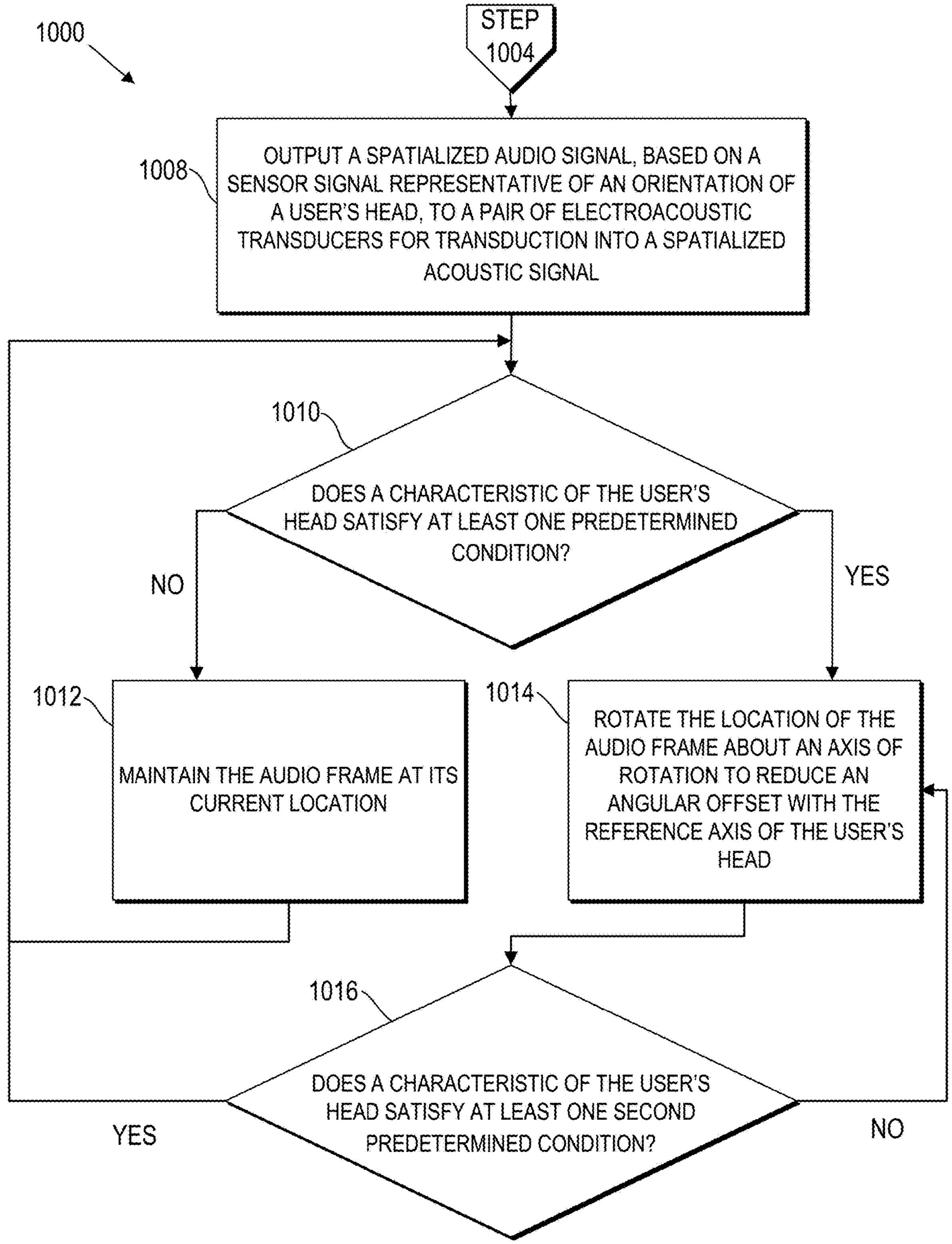
Figure 10C:
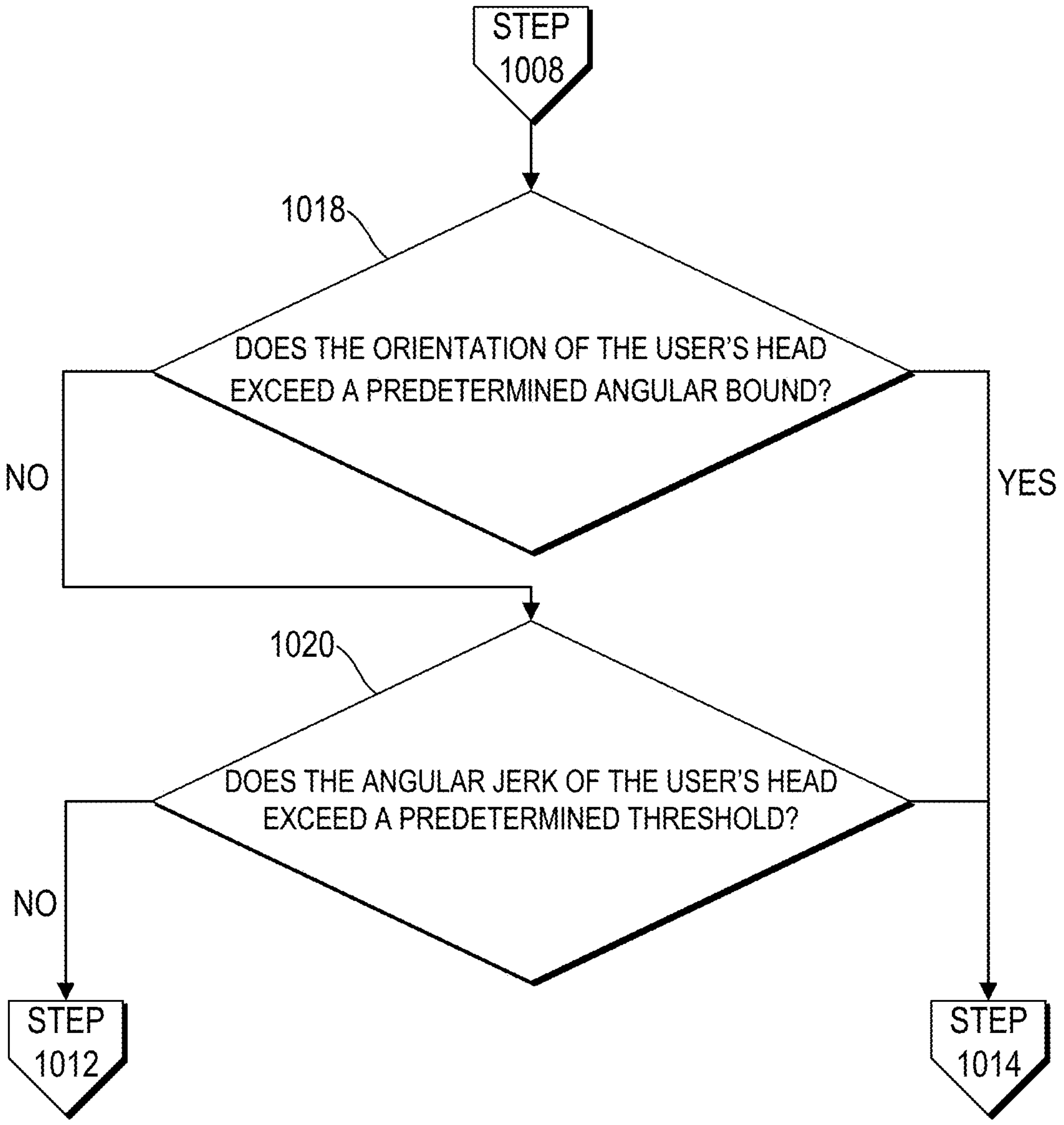

Turning briefly to FIG. 10C, there is shown an example of step 1010, comprising steps 1018 and 1020. Step 1018 is a decision block that represents determining whether the orientation of a user's head exceeds a predetermined angular bound. The angular bound can be used to determine whether the user's head has rotated beyond a predetermined extent. The angular bound, can, in one example, be a two-dimensional cone, although a three-dimensional cone and other suitable shapes are contemplated. A reference axis—which can be the same or different from the reference axis to determine the alignment of the audio frame—or a point can be compared against the angular bound to determine whether the orientation of the user's head has rotated beyond the predetermined extent. An example of comparing a reference axis (here, the longitudinal axis of the user's head) to an angular bound, is depicted in FIGS. 4-5. Upon determining the orientation of the user's head does not exceed the predetermined angular bound, the method proceeds to step 1020. Upon determining the orientation of the user's head exceeds the angular bound the method proceeds to step 1014.

Step 1020 is a decision block that represents determining whether the angular jerk of the user's head exceeds a predetermined threshold. In this example, the angular jerk of the user's head is compared to a threshold as early evidence of a turn that will likely exceed the angular bound. An example of comparing the angular jerk against a threshold is depicted and described in connection with FIGS. 6-7. Upon determining the angular jerk of the user's head does not exceed the predetermined threshold the method proceeds to step 1012 (i.e., continues in the static phase). Upon determining the angular jerk of the user's head exceeds the predetermined threshold, the method proceeds to step 1014 (i.e., begins the dynamic phase).

The angular jerk thus serves as another predetermined condition that can trigger the dynamic phase. Although an angular bound and an angular jerk threshold are described, it should be understood that other examples of suitable predetermined conditions, i.e., that are indicative or predictive of a head turn of at least a predetermined extent, are contemplated. It is also contemplated that only one such predetermined condition—e.g., only the angular bound or only the angular jerk threshold—can be used.

Upon determining at least one predetermined condition is not satisfied, then, at step 1012, the audio frame is maintained at its current location. In other words, in the above examples, upon determining the user's head is within the angular bound and the angular jerk is below the threshold. Maintaining the audio frame at the current location is implemented by rendering the at least one virtual source such that it is perceived as fixed in space, regardless of the movement of the user's head (in actuality, this requires adjusting the spatialized acoustic signal, based on detected changes to the orientation of the user's head, in a manner that the virtual sources are perceived as fixed in space). Thus, upon determining the user's head is relatively stationary (e.g., the user is seated at a desk), the user will perceive as the virtual soundstage as fixed in space.

Returning to FIG. 10B, at least one predetermined condition is satisfied, then, at step 1014, the location of the audio frame is rotated about an axis of rotation to reduce an angular offset with a reference axis of the user's head. Stated differently, the virtual soundstage can be rotated about the axis of rotation of the user's head (or an axis approximately located about the axis of rotation of the user's head) to reduce the offset introduced by the user's head rotation. As will be described in connection with FIG. 10D, this rotation can continue until the audio frame is aligned with the reference axis. Aligning the audio frame with the reference axis comprises rotating the virtual soundstage by the same angle of rotation the user's head rotated. Thus, if the user's head has rotated 15° from its initial position, the virtual soundstage is likewise rotated 15° to align it with the user's head. Further, because the virtual soundstage is comprised of at least one virtual source, rotation of the audio frame is accomplished by the respective rotation of each virtual source. Thus, rotation of the virtual soundstage by 15° is accomplished by the 15° rotation of each virtual source.

Figure 10D:
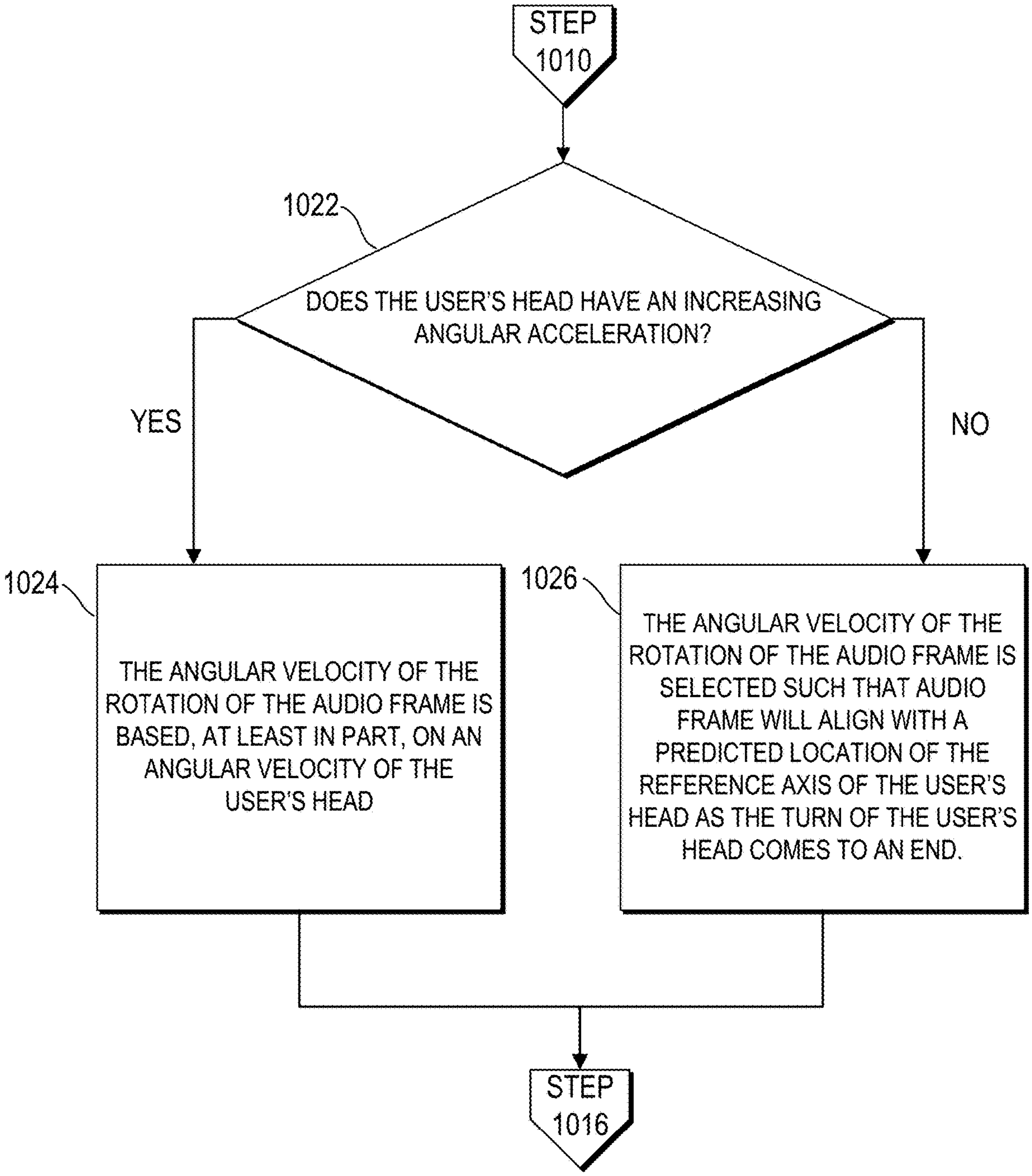

Turning momentarily to FIG. 10D, there is shown, in steps 1022-1026, method steps that show in greater detail how the rotation of step 1014 is accomplished, and, more particularly, how the rate of rotation of the virtual soundstage at step 1014 (and thus the rate of rotation of each virtual source) is selected. Step 1022 is a decision block that represents whether a user' head has an increasing angular acceleration. Upon determining the user's head has an increasing angular acceleration the method proceeds to step 1024, where the angular velocity of the rotation of the audio frame is based, at least in part, on a velocity of the user's head. In an example, the angular velocity can be set to a scaled value of the angular velocity of the user's head, the scaling value being based on the acceleration of the user's head (as described in connection with Eq. (5)). The value of the angular velocity of the virtual soundstage is selected to rotate the virtual soundstage at a pace that follows the user's head but permits some amount of lag so that the illusion of the virtual soundstage does not collapse. The angular velocity of the virtual soundstage can, however, further be summed with a baseline velocity, to account for a distracting lagging virtual soundstage when the user's head is slowly turning.

Upon determining, however, at step 1022, the user's head does not have an angular acceleration, then at step 1026 the angular velocity of the rotation of the audio frame is selected such that the audio frame will align with a predicted location of the reference axis as the turn of the user's head will come to an end. This can be accomplished by first predicting the time at which the user's head will stop turning (by assuming that the current deceleration continues) and the angular rotation traveled by the user's head from its current location to that time. The angular velocity the virtual soundstage (and, thus, of each virtual source) can then be selected so that, at the predicted time, the virtual soundstage will align with the user's head, meaning that it will compensate for both the existing offset between the virtual soundstage and the user's head, and the additional angle that the user's head will travel between the current time and the predicted time (as described in connection with Eq. (5) above).

Figure 10E:
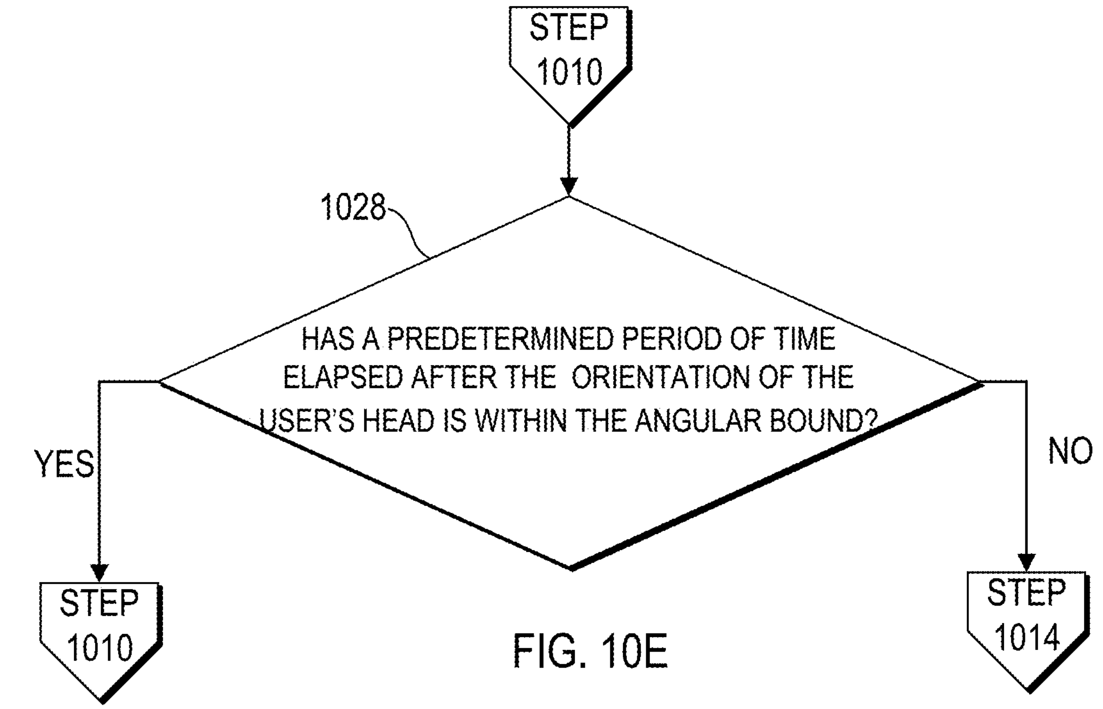
Figure 10F:
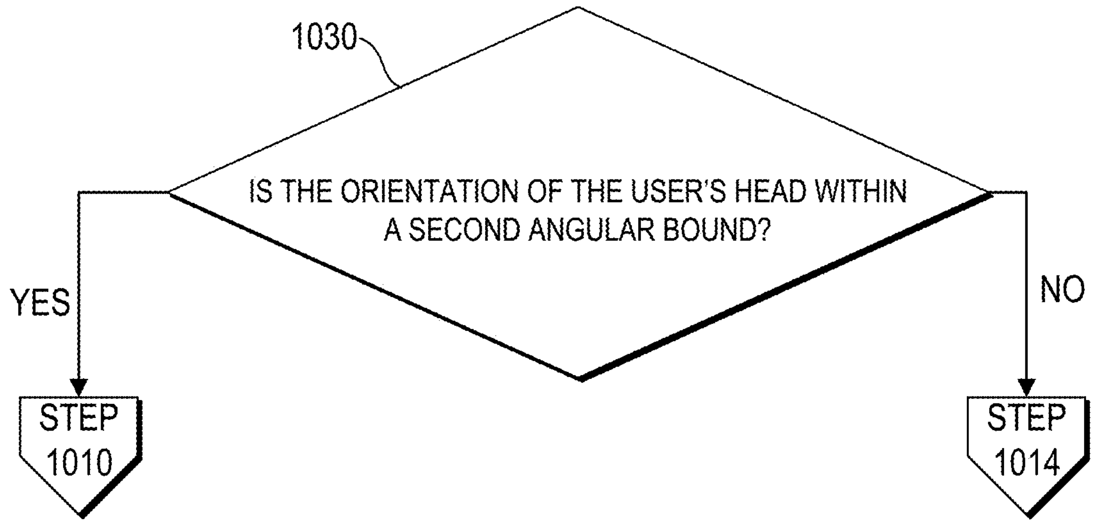

Returning to FIG. 10B, step 1016 is a decision block that determines whether a characteristic of the user's head satisfies at least one second predetermined condition. The at least one second predetermined condition is a condition that signals the end of the dynamic phase of the head-fixed mode. FIGS. 10E and 10F provide examples of second predetermined conditions. Specifically, FIG. 10E, and step 1028, is a decision block that determines whether a predetermined period of time has elapsed after the orientation of the orientation of the user's head (as indicated by a reference axis or point of the user's head) is again within the angular bound. The controller is programmed to rotate the angular bound about the axis of rotation in conjunction with the audio frame (that is, the angular bound rotates the same amount as the user's head from the user's head's initial position). Practically, this means that the angular bound will overtake the reference axis or point of the user's head before the audio frame is again aligned with the (alignment) reference axis. The reference axis or point returning to the angular bound can begin a predetermined period of time, after which the controller exits the dynamic phase of the head-fixed mode, returning to step 1010. Before the predetermined period of time, initiated by the reference axis or point returning to within the angular bound (typically accomplished by the angular bound overtaking the reference axis), expires, the method returns to step 1014 to continue rotating the virtual soundstage (and the angular bound).

FIG. 10F, and step 1030, is a decision block that that determines whether the orientation of the user's head (as indicated by a reference axis or point of the user's head) is within a second angular bound. The controller is programmed to rotate the angular bound and a second angular bound about the axis of rotation in conjunction with the audio frame (thus, both the angular bound and the second angular bound rotate the same amount as the user's head from the user's head's initial position). The second angular bound can be narrower than the angular bound that gave rise to entering the dynamic phase at step 1010 (as, for example, described in connection with FIG. 5A). In this example, rather than wait an additional predetermined period of time, entering the second angular bound signals sufficient alignment of the audio frame with the reference axis or point and thus the end of the dynamic phase, by returning to step 1010. Before the reference axis enters the second angular bound, the method returns to step 1014 to continue rotating the virtual stage (and the second angular bound).

Looking at FIG. 10B, it can be seen that method 1000 returns to step 1010 to again determine whether to enter the dynamic phase. When the current sample does not satisfy the predetermined condition, the audio frame is maintained at its current location. Its current location, after having exited the dynamic phase, is the location at which the audio frame arrived because of the dynamic phase. When the current does satisfy the at least one predetermined condition, the virtual soundstage is rotated and continues to be rotated each sample until the at least one second predetermined is reached, at which point the method returns to 1010.

Not shown in method 1000 is an additional condition to exit the head-tracking phase entirely. This can be accomplished, for example, by returning each sample or periodically to step 1004 to determine whether the requirements for the head-fixed mode continue to be satisfied. Upon determining the requirements are no longer satisfied, the method can enter the room fixed mode or some other mode.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A pair of headphones, comprising:

a sensor outputting a sensor signal representative of an orientation of a user's head; and a controller, receiving the sensor signal, the controller programmed to output a spatialized audio signal, based on the sensor signal, to a pair of electroacoustic transducers for transduction into a spatialized acoustic signal, wherein the spatialized acoustic signal is perceived by the user as originating from a virtual soundstage comprising at least one virtual source, each virtual source of the virtual soundstage being perceived as located at a respective position distinct from the location of the electroacoustic transducers and being referenced to an audio frame of the virtual soundstage, the audio frame being disposed a first location aligned with a reference axis of the user's head;

wherein the controller is further programmed to determine, from the sensor signal, whether a characteristic of the user's head satisfies at least one predetermined condition, the at least one predetermined condition including whether the orientation of the user's head is outside a predetermined angular bound, wherein, upon determining the characteristic of the user's head does not satisfy the at least one predetermined condition, the controller is programmed to maintain the audio frame at the first location, wherein, upon determining the characteristic of the user's head satisfies the at least one predetermined condition, the controller is programmed to rotate the location of the audio frame about an axis of rotation to reduce an angular offset with the reference axis of the user's head, wherein, while the user's head has a decreasing angular acceleration, the angular velocity of the rotation of the audio frame is selected such that audio frame will align with a predicted location of the reference axis of the user's head as the turn of the user's head comes to an end.

2. The pair of headphones of claim 1, wherein, while the user's head has an increasing angular acceleration, an angular velocity of the rotation of the audio frame is based, at least in part, on an angular velocity of the user's head.

3. The pair of headphones of claim 1, wherein the predicted location of the reference axis of the user's head as the turn of the user's head comes to an end is updated each sample that the user's head has a decreasing angular acceleration.

4. The pair of headphones of claim 1, wherein the at least one predetermined condition further includes whether an angular jerk of the user's head exceeds a predetermined threshold, wherein the at least one predetermined condition is satisfied if either the orientation of the user's head is outside the predetermined angular bound or the angular jerk of the user's head exceeds the predetermined threshold.

5. The pair of headphones of claim 1, wherein, upon determining the orientation of the user's head is outside the predetermined angular bound, the controller is programmed to rotate the angular bound about the axis of rotation in conjunction with the audio frame, wherein the location of the audio frame is rotated about an axis of rotation to reduce an angular offset with the reference axis of the user's head for a predetermined period of time after the orientation of the user's head is again within the angular bound.

6. The pair of headphones of claim 1, wherein upon determining the orientation of the user's head is outside the predetermined angular bound, a second angular bound, narrower than the angular bound, is rotated about the axis of rotation in conjunction with the audio frame, wherein the location of the audio frame is rotated about an axis of rotation to reduce an angular offset with the reference axis of the user's head for a predetermined period of time until the orientation of the user's head is within the second angular bound.

7. The pair of headphones of claim 1, wherein the at least one virtual source comprises a first virtual source and a second virtual source, the first virtual source being disposed in a first location and the second virtual source being disposed in a second location, wherein the first location and the second location are referenced to the audio frame.

8. The pair of headphones of claim 1, wherein maintaining the audio frame at a first location comprises rotating the audio frame at a rate tailored to eliminate drift of the sensor.

9. The pair of headphones of claim 1, wherein the sensor outputting the sensor signal comprises a plurality of sensors outputting a plurality of signals.

10. A method for providing spatialized audio, comprising:

outputting a spatialized audio signal, based on a sensor signal representative of an orientation of a user's head, to a pair of electroacoustic transducers for transduction into a spatialized acoustic signal, wherein the spatialized acoustic signal is perceived by the user as originating from a virtual soundstage comprising at least one virtual source, each virtual source of the virtual soundstage being perceived as located at a respective position distinct from the location of the electroacoustic transducers and being referenced to an audio frame of the virtual soundstage, the audio frame being disposed a first location aligned with a reference axis of the user's head;

determining, from the sensor signal, whether a characteristic of the user's head satisfies at least one predetermined condition, the at least one predetermined condition including whether the orientation of the user's head is outside a predetermined angular bound, and rotating, upon determining the characteristic of the user's head satisfies the at least one predetermined condition, the location of the audio frame about an axis of rotation to reduce an angular offset with the reference axis of the user's head, wherein, while the user's head has a decreasing angular acceleration, the angular velocity of the rotation of the audio frame is selected such that audio frame will align with a predicted location of the reference axis of the user's head as the turn of the user's head comes to an end.

11. The method of claim 10, wherein, while the user's head has an increasing angular acceleration, an angular velocity of the rotation of the audio frame is based, at least in part, on an angular velocity of the user's head.

12. The method of claim 10, wherein the predicted location of the reference axis of the user's head as the turn of the user's head comes to an end is updated each sample that the user's head has a decreasing angular acceleration.

13. The method of claim 10, wherein the at least one predetermined condition further includes whether an angular jerk of the user's head exceeds a predetermined threshold, wherein the at least one predetermined condition is satisfied if either the orientation of the user's head is outside the predetermined angular bound or the angular jerk of the user's head exceeds the predetermined threshold.

14. The method of claim 10, wherein, upon determining the orientation of the user's head is outside the predetermined angular bound, the angular bound is rotated about the axis of rotation in conjunction with the audio frame, wherein the location of the audio frame is rotated about an axis of rotation to reduce an angular offset with the reference axis of the user's head for a predetermined period of time after the orientation of the user's head is within the angular bound.

15. The method of claim 10, wherein, upon determining the orientation of the user's head is outside the predetermined angular bound, a second angular bound, narrower than the angular bound, is rotated about the axis of rotation in conjunction with the audio frame, wherein the location of the audio frame is rotated about an axis of rotation to reduce an angular offset with the reference axis of the user's head for a predetermined period of time until the orientation of the user's head is within the second angular bound.

16. The method of claim 10, wherein the at least one virtual source comprises a first virtual source and a second virtual source, the first virtual source being disposed in a first location and the second virtual source being disposed in a second location, wherein the first location and the second location are referenced to the audio frame.

17. The method of claim 10, wherein maintaining the audio frame at a first location comprises rotating the audio frame at a rate tailored to eliminate drift of the sensor.

18. The method of claim 10, wherein the sensor outputting the sensor signal comprises a plurality of sensors outputting a plurality of signals.

* * * * *